United States Patent
Sowizral et al.

(10) Patent No.: US 6,750,859 B2
(45) Date of Patent: Jun. 15, 2004

(54) SIZE CONDITIONED VISIBILITY SEARCH SYSTEM AND METHOD

(75) Inventors: Henry A. Sowizral, Bellvue, WA (US); Karel Zikan, Seattle, WA (US); Randall G. Keller, San Carlos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 422 days.

(21) Appl. No.: 09/948,960

(22) Filed: Sep. 7, 2001

(65) Prior Publication Data

US 2002/0033835 A1 Mar. 21, 2002

Related U.S. Application Data

(63) Continuation of application No. 09/894,662, filed on Jun. 28, 2001, now abandoned.
(60) Provisional application No. 60/214,843, filed on Jun. 28, 2000.

(51) Int. Cl.[7] .............................................. G06F 17/00
(52) U.S. Cl. ........................ 345/418; 345/619; 707/102
(58) Field of Search ...................... 707/1–206; 345/418, 345/419–428, 619–628

(56) References Cited

U.S. PATENT DOCUMENTS 6,509,898 B2 * 1/2003 Chi et al. ....................... 707/3
6,522,292 B1 * 2/2003 Ellenby et al. ................. 707/1
6,629,097 B1 * 9/2003 Keith ............................. 707/5

OTHER PUBLICATIONS

Seki et al., A double–layer electrically controlled birefringence liquid crystal display with a wide–viewing–angle cone, Display Research Conference, 1991, Conference Record of the 1991 International, Oct. 15–17, 1991, pp. 188–191.*

Noborio et al., Construction of the octree approximating a three–dimensionial object by using multiple views, Pattern Analysis and Machine Intelligence, IEEE Transactions on, vol. 10, Issue 6, Nov. 1988, pp. 769–782.*

Ng et al., A novel method for segmentation of cones and cylinders from geometrically fused depth maps, Image processing and its Applications, 1995, Fifth International Conference on, Jul. 4–6, 1995, pp. 544–548.*

* cited by examiner

*Primary Examiner*—David Jung
(74) *Attorney, Agent, or Firm*—Meyertons Hood Kivlin Kowert & Goetzel, P.C.; Jeffrey C. Hood; Mark K. Brightwell

(57) ABSTRACT

A system for performing visible object determination. Visualization software running on a host processor represents space with a hierarchy of cones, and generates a hierarchy of bounding hulls from a collection of objects by recursively grouping clusters of objects. Each hull node in the hull hierarchy stores parameters which characterize a bounding hull for the corresponding cluster or object. The visualization software searches the cone and hull hierarchies starting with the root cone and the root hull. Before exploring a given cone-hull pair, a normalized cone size for the cone and a normalized hull size for the hull may be computed, and the sizes compared. If the cone size is larger than the hull size, subcones of the cone are explored with respect to the hull. Conversely, if the hull size is larger than the cone size, subhulls of the hull are explored with respect to the cone.

50 Claims, 18 Drawing Sheets

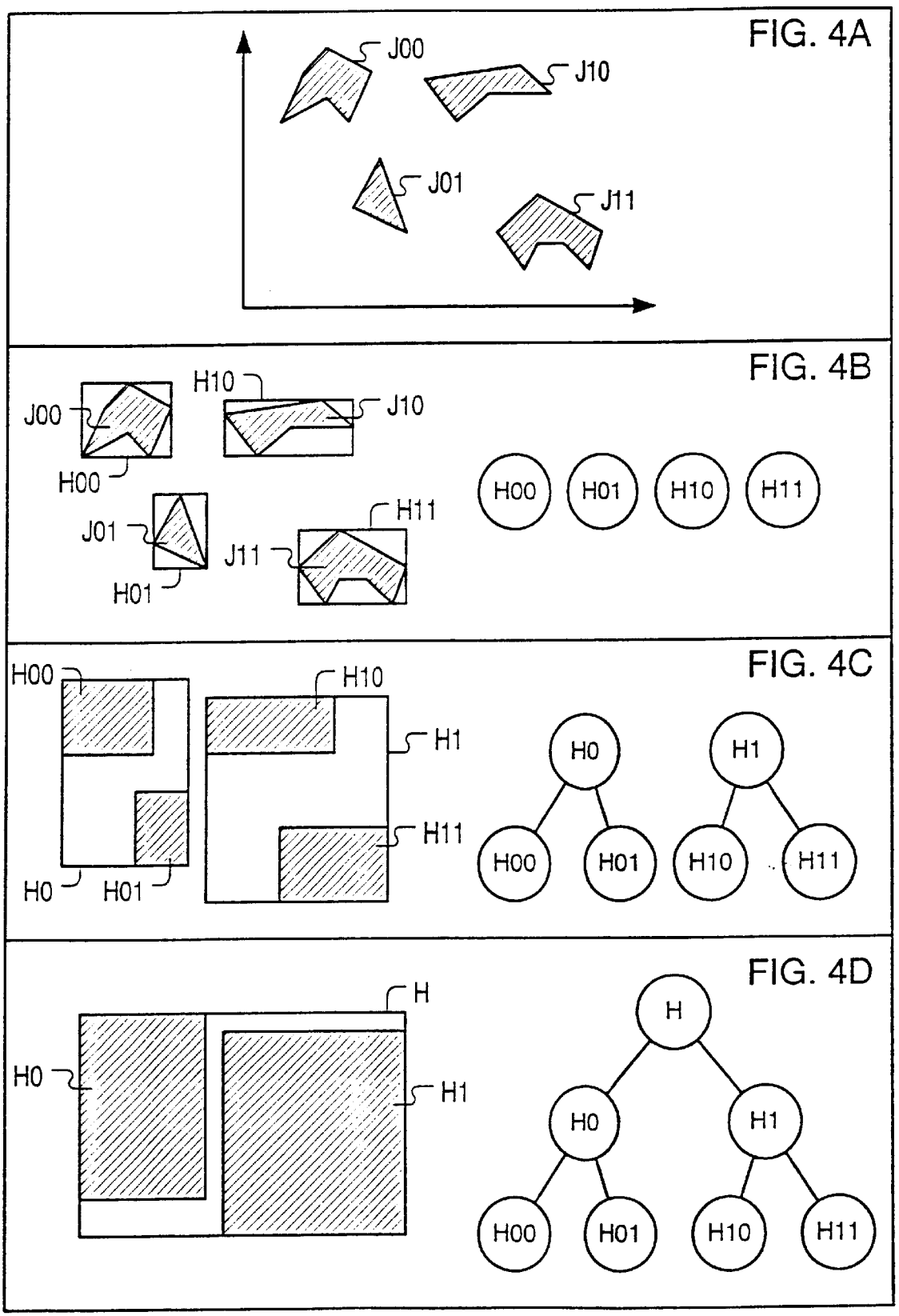

SIZE CONDITIONED VISIBILITY SEARCH SYSTEM AND METHOD

CROSS REFERENCES TO RELATED APPLICATIONS

This application is a continuation of U.S. patent application Ser. No. 09/894,662 filed on Jun. 28, 2001 now abandoned entitled "Size Conditioned Visibility Search System and Method" which claims the benefit of U.S. Provisional Application No. 60/214,843 filed on Jun. 28, 2000 entitled "Size Conditioned Visibility Search System and Method".

BACKGROUND OF THE INVENTION

1. Field of the Invention

The present invention relates generally to the field of computer graphics, and more particularly, to the problem of determining the set of objects (and portions of objects) visible from a defined viewpoint in a graphics environment.

2. Description of the Related Art

Visualization software has proven to be very useful in evaluating three-dimensional designs long before the physical realization of those designs. In addition, visualization software has shown its cost effectiveness by allowing engineering companies to find design problems early in the design cycle, thus saving them significant amounts of money. Unfortunately, the need to view more and more complex scenes has outpaced the ability of graphics hardware systems to display them at reasonable frame rates. As scene complexity grows, visualization software designers need to carefully use the rendering resource provided by graphic hardware pipelines.

A hardware pipeline wastes rendering bandwidth when it discards rendered triangle work. Rendering bandwidth waste can be decreased by not asking the pipeline to draw triangles that it will discard. Various software methods for reducing pipeline waste have evolved over time. Each technique reduces waste at a different point within the pipeline. As an example, software culling of objects falling outside the view frustum can significantly reduce discards in a pipeline's clipping computation. Similarly, software culling of backfacing triangles can reduce discards in a pipeline's lighting computation.

The z-buffer is the final part of the graphics pipeline that discards work. In essence, the z-buffer retains visible surfaces, and discards those not visible because they are behind another surface (i.e. occluded). As scene complexity increases, especially in walk-through and CAD environments, the number of occluded surfaces rises rapidly and as a result the number of surfaces that the z-buffer discards rises as well. A frame's average depth complexity determines roughly how much work (and thus rendering bandwidth) the z-buffer discards. In a frame with a per-pixel depth complexity of d the pipeline's effectiveness is 1/d. As depth complexity rises, the hardware pipeline thus becomes proportionally less and less effective.

Software occlusion culling has been proposed as an additional tool for improving rendering effectiveness. A visualization program which performs occlusion culling effectively increases the overall rendering bandwidth of the graphics hardware by not asking the hardware pipeline to draw occluded objects. Computing a scene's visible objects is the complementary problem to that of occlusion culling. Rather than removing occluded objects from the set of objects in a scene or frustum-culled scene, a program instead computes which objects are visible and instructs the rendering hardware to draw just those. A simple visualization program can compute the set of visible objects and draw those objects from the current viewpoint, thus allowing the pipeline to focus on removing backfacing polygons and the z-buffer to remove any non-visible surfaces of those objects.

One technique for computing the visible object set uses ray casting as shown in FIG. 1. RealEyes [Sowizral, H. A., Zikan, K., Esposito, C., Janin, A., Mizell, D., "RealEyes: A System for Visualizing Very Large Physical Structures", SIGGRAPH '94, Visual Proceedings, 1994, p. 228], a system that implemented the ray casting technique, was demonstrated in SIGGRAPH 1994's BOOM room. At interactive rates, visitors could "walk" around the interior of a Boeing 747 or explore the structures comprising Space Station Freedom's lab module.

The intuition for the use of rays in determining visibility relies on the properties of light. The first object encountered along a ray is visible since it alone can reflect light into the viewer's eye. Also, that object interposes itself between the viewer and all succeeding objects along the ray making them not visible. In the discrete world of computer graphics, it is difficult to propagate a continuum of rays. So a discrete subset of rays is invariably used. Of course, this implies that visible objects or segments of objects smaller than the resolution of the ray sample may be missed and not discovered. This is because rays guarantee correct determination of visible objects only up to the density of the ray-sample. FIG. 1 illustrates the ray-based method of visible object detection. Rays that interact with one or more objects are marked with a dot at the point of their first contact with an object. It is this point of first contact that determines the value of the screen pixel corresponding to the ray. Also observe that the object 10 is small enough to be entirely missed by the given ray sample.

Visible-object determination has its roots in visible-surface determination. Foley et al. [Foley, J., van Dam, A., Feiner, S. and Hughes, J. Computer Graphics: Principles and Practice, 2nd ed., Addison-Wesley, Chapter 15, pp. 649–718, 1996] classify visible-surface determination approaches into two broad groups: image-precision and object-precision algorithms. Image precision algorithms typically operate at the resolution of the display device and tend to have superior performance computationally. Object precision approaches operate in object space - usually performing object to object comparisons.

A prototypical image-precision visible-surface-determination algorithm casts rays from the viewpoint through the center of each display pixel to determine the nearest visible surface along each ray. The list of applications of visible-surface ray casting (or ray tracing) is long and distinguished. Appel ["Some Techniques for Shading Machine Rendering of Solids", SJCC'68, pp. 37–45, 1968] uses ray casting for shading. Goldstein and Nagel [Mathematical Applications Group, Inc., "3-D Simulated Graphics Offered by Service Bureau," Datamation, 13(1), February 1968, p. 69.; see also Goldstein, R. A. and Nagel, R., "3-D Visual Simulation", Simulation, 16(1), pp. 25–31, 1971] use ray casting for boolean set operations. Kay et al. [Kay, D. S. and Greenberg, D., "Transparency for Computer Synthesized Images," SIGGRAPH'79, pp. 158–164] and Whitted ["An Improved Illumination Model for Shaded Display", CACM, 23(6), pp. 343–349, 1980] use ray tracing for refraction and specular reflection computations. Airey et al. [Airey, J. M., Rohlf, J. H. and Brooks, Jr. F. P., "Towards Image Realism with Interactive Update Rates in Complex Virtual Building Environments", ACM SIGGRAPH Symposium on Interactive 3D Graphics, 24, 2(1990), pp. 41–50]

uses ray casting for computing the portion of a model visible from a given cell.

Another approach to visible-surface determination relies on sending beams or cones into a database of surfaces [see Dadoun et al., "Hierarchical approachs to hidden surface intersection testing", Proceeedings of Graphics Interface '82, Toronto, May 1982, 49–56; see also Dadoun et al., "The geometry of beam tracing", In Joseph O'Rourke, ed., Proceeedings of the Symposium on Computational Geometry, pp. 55–61, ACM Press, New York, 1985]. Essentially, beams become a replacement for rays. The approach usually results in compact beams decomposing into a set of possibly non-connected cone(s) after interacting with an object.

A variety of spatial subdivision schemes have been used to impose a spatial structure on the objects in a scene. The following four references pertain to spatial subdivision schemes: (a) Glassner, "Space subdivision for fast ray tracing," IEEE CG&A, 4(10):15–22, October 1984; (b) Jevans et al., "Adaptive voxel subdivision for ray tracing," Proceedings Graphics Interface '89, 164–172, June 1989; (c) Kaplan, M. "The use of spatial coherence in ray tracing," in Techniques for Computer Graphics . . . , Rogers, D. and Eamshaw, R. A. (eds), Springer-Verlag, New York, 1987; and (d) Rubin, S. M. and Whitted, T. "A 3-dimensional representation for fast rendering of complex scenes," Computer Graphics, 14(3):110–116, July 1980.

Kay et al. [Kay, T. L. and Kajiya, J. T., "Ray Tracing Complex Scenes", SIGGRAPH 1986, pp. 269–278, 1986], concentrating on the computational aspect of ray casting, employed a hierarchy of spatial bounding volumes in conjunction with rays, to determine the visible objects along each ray. Of course, the spatial hierarchy needs to be precomputed. However, once in place, such a hierarchy facilitates a recursive computation for finding objects. If the environment is stationary, the same data-structure facilitates finding the visible object along any ray from any origin.

Teller et al. [Teller, S. and Sequin, C. H., "Visibility Preprocessing for Interactive Walkthroughs," SIGGRAPH '91, pp. 61–69] use preprocessing to full advantage in visible-object computation by precomputing cell-to-cell visibility. Their approach is essentially an object precision approach and they report over 6 hours of preprocessing time to calculate 58 Mbytes of visibility information for a 250,000 polygon model on a 50 MIP machine [Teller, S. and Sequin. C. H., "Visibility computations in polyhedral three-dimensional environments," U.C. Berkeley Report No. UCB/CSD 92/680, April 1992].

In a different approach to visibility computation, Greene et al. [Greene, N., Kass, M., and Miller, G., "Hierarchical z-Buffer Visibility," SIGGRAPH '93, pp. 231–238] use a variety of hierarchical data structures to help exploit the spatial structure inherent in object space (an octree of objects), the image structure inherent in pixels (a Z pyramid), and the temporal structure inherent in frame-by-frame rendering (a list of previously visible octree nodes). The Z-pyramid permits the rapid culling of large portions of the model by testing for visibility using a rapid scan conversion of the cubes in the octree.

As used herein, the term "octree" refers to a data structure derived from a hierarchical subdivision of a three-dimensional space based on octants. The three-dimensional space may be divided into octants based on three mutually perpendicular partitioning planes. Each octant may be further partitioned into eight sub-octants based on three more partitioning planes. Each sub-octant may be partitioned into eight sub-suboctants, and so forth. Each octant, sub-octant, etc., may be assigned a node in the data structure. For more information concerning octrees, see pages 550–555, 559–560 and 695–698 of *Computer Graphics: principles and practice,* James D. Foley et al., $2^{nd}$ edition in C, ISBN 0-201-84840-6, T385.C5735, 1996.

The depth complexity of graphical environments continues to increase in response to consumer demand for realism and performance. Thus, the efficiency of an algorithm for visible object determination has a direct impact on the marketability of a visualization system. The computational bandwidth required by the visible object determination algorithm determines the class of processor required for the visualization system, and thereby affects overall system cost. Thus, a system and method for improving the efficiency of visible object determination is greatly desired.

SUMMARY OF THE PRESENT INVENTION

Various embodiments of a system and method for performing visible object determination based upon a dual search of a cone hierarchy and a bounding hierarchy are herein disclosed. In one embodiment, the system may comprise a processor, a display device, system memory, and optionally a graphics accelerator. The processor executes visualization software which operates on a collection of graphics objects to determine a visible subset of the objects from a defined viewpoint. The objects may reside in a three-dimensional space and thus admit the possibility of occluding one another.

The visualization software represents space in terms of a hierarchy of cones emanating from a viewpoint. In one embodiment, the leaf-cones of the cone hierarchy, i.e. the cones at the ultimate level of refinement, subtend an area which corresponds to a fraction of a pixel in screen area. For example, two cones may conveniently fill the area of a pixel. In other embodiments, a leaf-cone may subtend areas which include one or more pixels.

An initial view frustum or neighborhood of the view frustum may be recursively tessellated (i.e. refined) to generate a cone hierarchy. Alternatively, the entire space around the viewpoint may be recursively tessellated to generate the cone hierarchy. In this embodiment, the cone hierarchy is recomputed for changes in the viewpoint and view-direction. The cone hierarchy is also referred to herein as the cone tree structure.

The visualization software may also generate a hierarchy of bounds from the collection of objects. In particular, the bounding hierarchy may be generated by: (a) recursively grouping clusters starting with the objects themselves as order-zero clusters, (b) bounding each object and cluster (of all orders) with a corresponding bound, e.g. a polytope hull, (c) allocating a node in the bounding hierarchy for each object and cluster, and (d) organizing the nodes in the bounding hierarchy to reflect cluster membership. For example if node A is the parent of node B, the cluster corresponding to node A contains a subcluster (or object) corresponding to node B. Each node stores parameters which characterize the bound of the corresponding cluster or object. The bounding hierarchy is also referred to herein as the bound tree structure.

The visualization software may perform a search of the cone tree structure and the bound tree structure starting with the root cone and the root bound. In one embodiment, each leaf-cone may be assigned a visibility distance value which represents the distance to the closest known object as perceived from within the leaf-cone. Each leaf-cone may also be assigned an object attribute which specifies the closest known object within view of the leaf-cone. Similarly, each non-leaf cone may be assigned a visibility distance value. However, the visibility distance value of a non-leaf cone is set equal to the maximum of the visibility distance values for its subcone children. This implies that the visibility distance value for each non-leaf cone equals the maximum of the visibility distance values of its leaf-cone descendents.

In response to execution of the visualization software, the processor may perform a visibility search method which comprises: (a) receiving a cone pointer which points to the cone tree structure stored in a memory, (b) receiving a bound pointer which points to the bound tree structure stored in the memory, wherein leaf bounds of the bound tree structure approximate a collection of graphical objects, (c) searching the cone tree structure and the bound tree structure to determine one or more nearest graphical objects for one or more cones of the cone tree structure, and (d) transmitting an indication of the one or more nearest graphical objects for the one or more cones to a rendering agent such as a software renderer or a hardware rendering unit. The rendering agent generates pixel values (and/or samples) for the indicated objects.

The dual-tree search may be illustrated in terms of a first cone of the cone tree structure and a first bound of the bound tree structure. The processor may compute a bound size for the first bound, and may compare the bound size to a cone size which corresponds to the first cone. If the bound size is larger than the cone size, the processor may search subbounds of the first bound with respect to the first cone. Conversely, if the cone size is larger than the bound size, the processor may search subcones of the first cone with respect to the first bound. A variety of methods are contemplated for computing the cone size and the bound size. By selecting the larger entity (first bound or first cone) for refinement, the visibility search method may, in some embodiments, prune the combined cone-bound tree more effectively, and determine the set of visible objects with increased efficiency.

BRIEF DESCRIPTION OF THE FIGURES

The foregoing, as well as other objects, features, and advantages of this invention may be more completely understood by reference to the following detailed description when read together with the accompanying drawings in which:

FIG. 4A illustrates a collection of objects in a graphics environment;

FIG. 4B illustrates a first step in one embodiment of a method for forming a hull hierarchy, i.e. the step of bounding objects with containing hulls and allocating hull nodes for the containing hulls;

FIG. 4C illustrates one embodiment of the process of grouping together hulls to form higher order hulls, and allocating nodes in the hull hierarchy which correspond to the higher order hulls;

FIG. 4D illustrates the culmination of one embodiment of the recursive grouping process wherein all objects are contained in a universal containing hull which corresponds to the root node of the hull hierarhcy;

Figure 1:
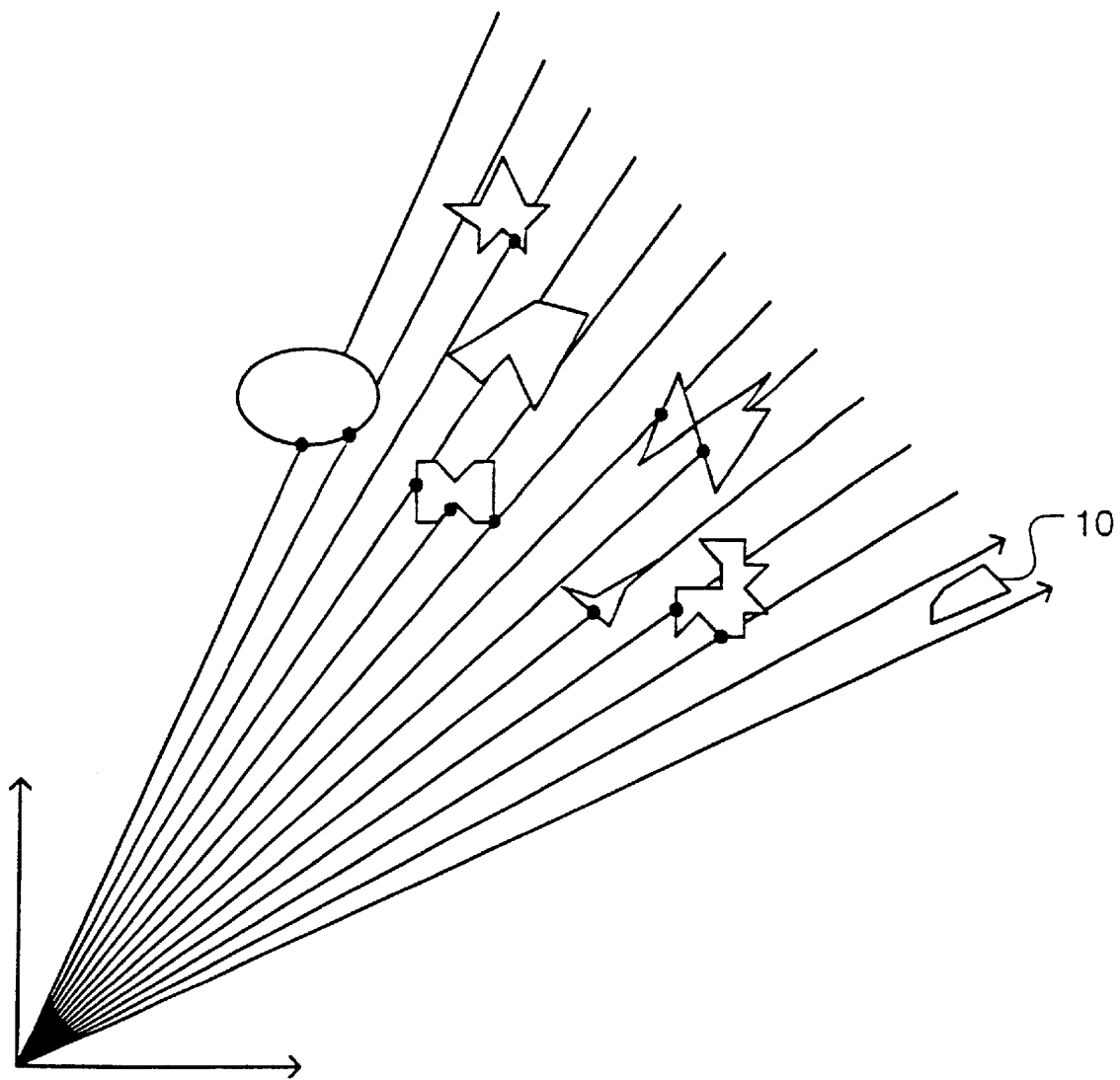
FIG. 1 illustrates the ray-based method of visible object detection according to the prior art.

While the invention is susceptible to various modifications and alternative forms, specific embodiments thereof are shown by way of example in the drawings and will herein be described in detail. It should be understood, however, that the drawings and detailed description thereto are not intended to limit the invention to the particular forms disclosed, but on the contrary, the intention is to cover all modifications, equivalents and alternatives falling within the spirit and scope of the present invention as defined by the appended claims. Please note that the section headings used herein are for organizational purposes only and are not meant to limit the description or claims. The word "may" is used in this application in a permissive sense (i.e., having the potential to, being able to), not a mandatory sense (i.e., must). Similarly, the word include, and derivations thereof, are used herein to mean "including, but not limited to."

DETAILED DESCRIPTION OF SEVERAL EMBODIMENTS

U.S. patent application Ser. No. 09/894,662 filed on Jun. 28, 2001 entitled "Size Conditioned Visibility Search System and Method" is hereby incorporated by reference in its entirety.

U.S. Provisional Application No. 60/214,843 filed on Jun. 28, 2000 entitled "Size Conditioned Visibility Search System and Method" is hereby incorporated by reference in its entirety.

Figure 2A:
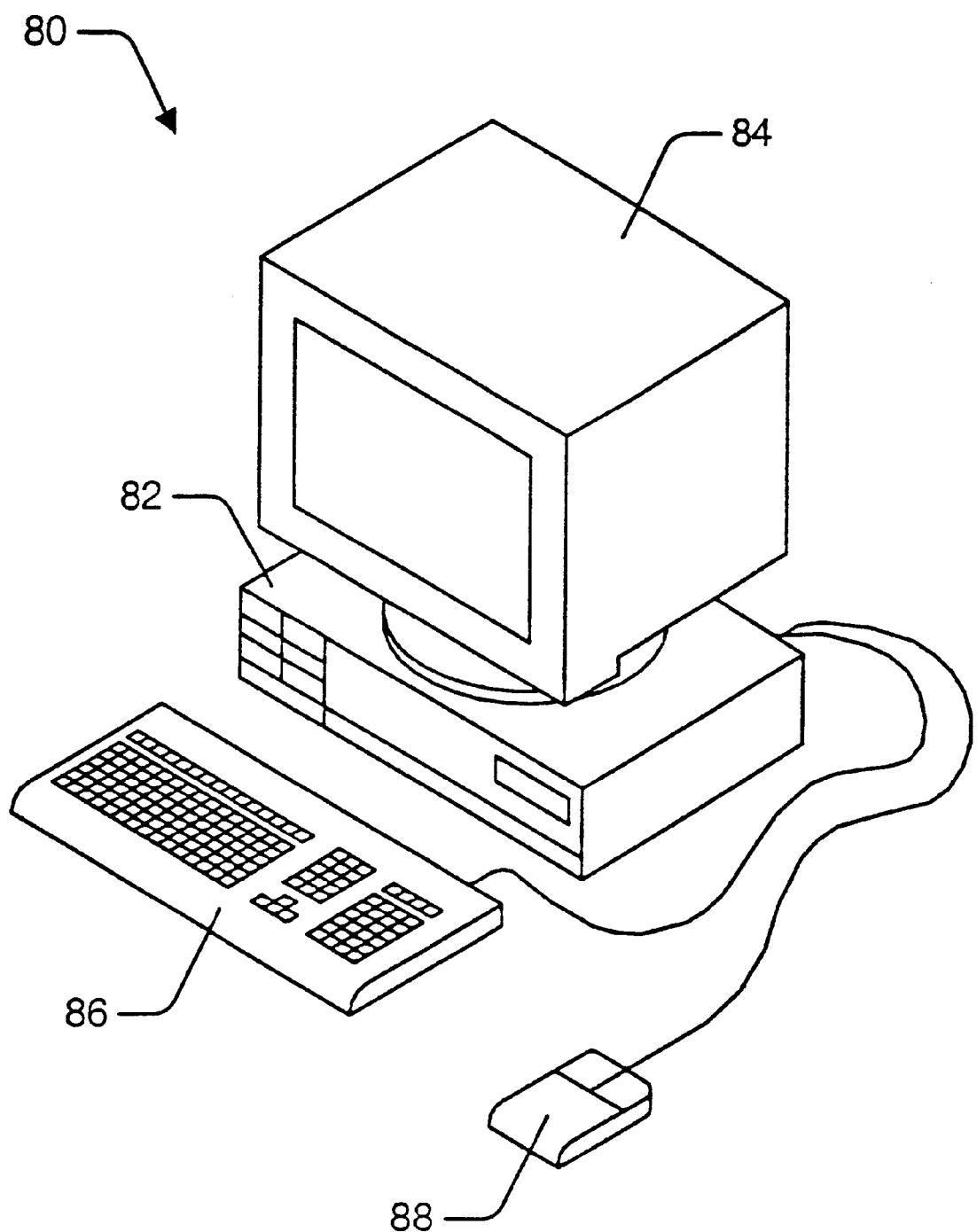
FIG. 2A illustrates one embodiment of a graphical computing system for performing visible object determination.

FIG. 2A presents one embodiment of a graphical computing system 80 for performing visible object determination. Graphical computing system 80 may include a system unit 82, and a display device 84 coupled to the system unit 82. The display device 84 may be realized by any of various types of video monitors or graphical displays. Graphics computer system 80 may include a keyboard 86 and preferably a mouse 88.

Figure 2B:
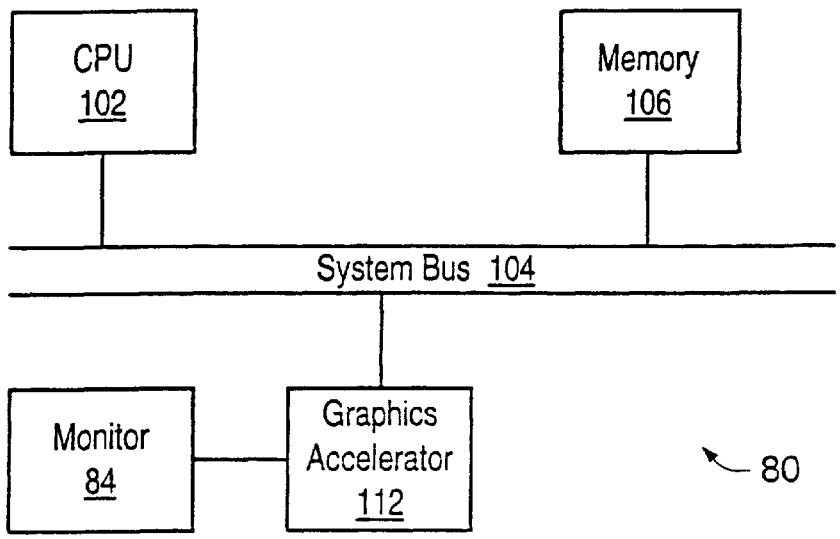
FIG. 2B is a block diagram illustrating one embodiment of the graphical computing 80.

FIG. 2B is a block diagram illustrating one embodiment of graphical computing system 80. Graphical computing system 80 may include a host central processing unit (CPU) 102 coupled to a high speed bus or system bus 104. A system memory 106 may also be coupled to system bus 104. The system memory 106 may include any of various types of memory subsystems including random access memory, read only memory, and/or mass storage devices. The host processor 102 may execute a visualization software program which determines the set of visible objects in a scene. The visualization software program may be stored in system memory 106. In an alternative embodiment, the visualization software program executes on a processor comprised within graphics accelerator 112.

In some embodiments, a 3-D graphics accelerator 112 may be coupled to system bus 104. If 3D accelerator 112 is not included in graphical computing system 80, then display device 84 may couple directly to system bus 104. It is assumed that various other peripheral devices, or other buses, may be connected to system bus 104, as is well known in the art. Display device 84 may couple to 3-D graphics accelerator 112. CPU 102 may transfer information to and from the graphics accelerator 112 according to a programmed input/output (I/O) protocol over the system bus 104. In one embodiment, the graphics accelerator 112 may access system memory 106 according to a direct memory access (DMA) protocol or through intelligent bus mastering.

3-D graphics accelerator 112 may be a specialized graphics rendering subsystem which is designed to off-load the 3-D rendering functions from the host processor, thus providing improved system performance. In a system with a 3-D graphics accelerator, a graphics application program executing on the host processor 102 may generate three-dimensional geometry data that defines three-dimensional graphics elements for output on a display device 84. The application program may transfer the geometry data to the graphics accelerator 112. The graphics accelerator 112 may receive the geometry data and render the corresponding graphics elements on the display device. A fundamental goal of computer graphics is to render objects that are realistic to the user. The problem of visual realism, however, is quite complex. Objects in the "real world" include an incredible amount of detail, including subtle variations in color, reflections, and surface irregularities. Applications which display three-dimensional graphics may require a tremendous amount of processing bandwidth.

The computer system 80 may include visualization software configured to operate on a collection of objects to determine a visible subset of the objects with respect to a viewpoint in a virtual screen space. The visualization software may be executed by the host processor 102, or by one or more processors comprised within the graphics accelerator 112.

Visualization Software Architecture

Figure 3:
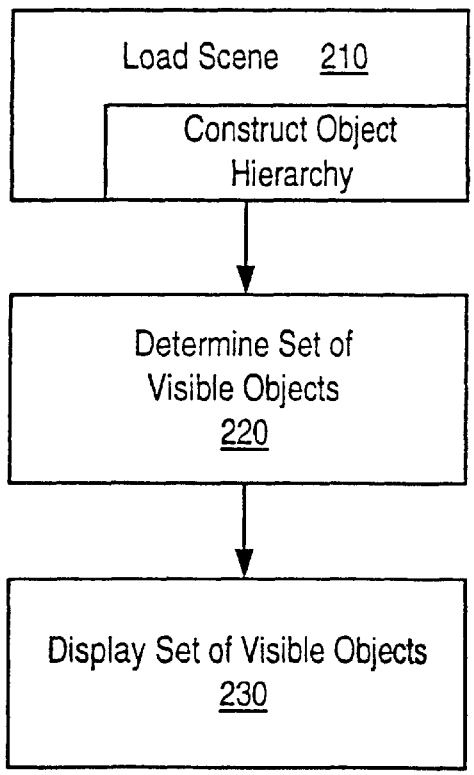
FIG. 3 illustrates several main phases of one embodiment of a visualization program.

FIG. 3 illustrates one embodiment of the visualization software. In an initial step 210, the visualization software may load a scene. The scene may comprise a plurality of objects. Scene loading may include constructing an object hierarchy—if it has not already been constructed. In step 220, the visualization software may discover the set of visible objects in the scene with respect to a current viewpoint. In the preferred embodiment, the visualization software may be configured to compute visibility for three-dimensional objects from a view point in a three-dimensional coordinate space. However, the methodologies herein described naturally generalize to spaces of arbitrary dimension.

In one embodiment of the visualization software, the viewpoint in the graphical environment may be changed in response to user input. For example, by manipulating mouse 88 and/or depressing keys on keyboard 86, the user may cause the viewpoint and/or view orientation to change. Thus, the visualization software may recompute the set of visible objects whenever the viewpoint and/or the view orientation changes.

In step 230, the visualization software may display the visible objects (or visible portions of objects). For example, the visualization software may command the graphics accelerator 112 to render the visible objects on the display screen. By performing visible object determination prior to object rendering, graphics accelerator 112 may operate with increased efficiency. Thereby, the overall processing capacity of graphics system 80 may be improved. Determination and display of the visible-object-set may be performed repeatedly as the viewpoint and/or view direction (i.e. orientation) changes, and/or as the objects themselves evolve in time. The determination and display steps may be performed as concurrent processes. However, in alternative embodiments, they may be performed sequentially.

In some embodiments, objects may be modeled as opaque convex polytopes. A three-dimensional solid is said to be convex if any two points in the solid (or on the surface of the solid) may be connected with a line segment which resides entirely within the solid. Thus a solid cube is convex, while a donut (i.e. solid torus) is not. A polytope is an object with planar sides (e.g. cube, tetrahedron, etc.). The methodologies described herein for opaque objects naturally extend to transparent or semi-transparent objects by not allowing such objects to terminate a cone computation. Although not all objects are convex, every object can be approximated as a union of convex polytopes. It is helpful to note that the visible-object-set computation does not require an exact computation, but rather a conservative one. In other words, it is permissible to over-estimate the set of visible objects.

Constructing the Object Hierarchy

Initially, the objects in a scene may be organized into a hierarchy that groups objects spatially. An octree is one possibility for generating the object hierarchy. However, in the preferred embodiment, a clustering algorithm is used which groups nearby objects then recursively clusters pairs of groups into larger containing spaces. The clustering algorithm employs a simple distance measure and thresholding operation to achieve the object clustering. FIGS. 4A–4D illustrate one embodiment of a clustering process for a collection of four objects J00 through J11. The objects are indexed in a fashion which anticipates their ultimate position in a binary tree of object groups. The objects are depicted as polygons situated in a plane (see FIG. 4A). However, the reader may imagine these objects as arbitrary three-dimensional objects. In one embodiment, the objects are three-dimensional polytopes.

Each object may be bounded, i.e. enclosed, by a corresponding bounding surface referred to herein as a bound. In the preferred embodiment, the bound for each object is a polytope hull (i.e. a hull having planar faces) as shown in FIG. 4B. The hulls H00 through H11 are given labels which are consistent with the objects they bound. For example, hull H00 bounds object J00. The hulls are illustrated as rectangles with sides parallel to a pair of coordinate axes. These hulls are intended to represent rectangular boxes (parallelepipeds) in three dimensions whose sides are normal to a fixed set of coordinate axes. For each hull a corresponding node data structure is generated. The node stores parameters which characterize the corresponding hull.

Figure 5A:
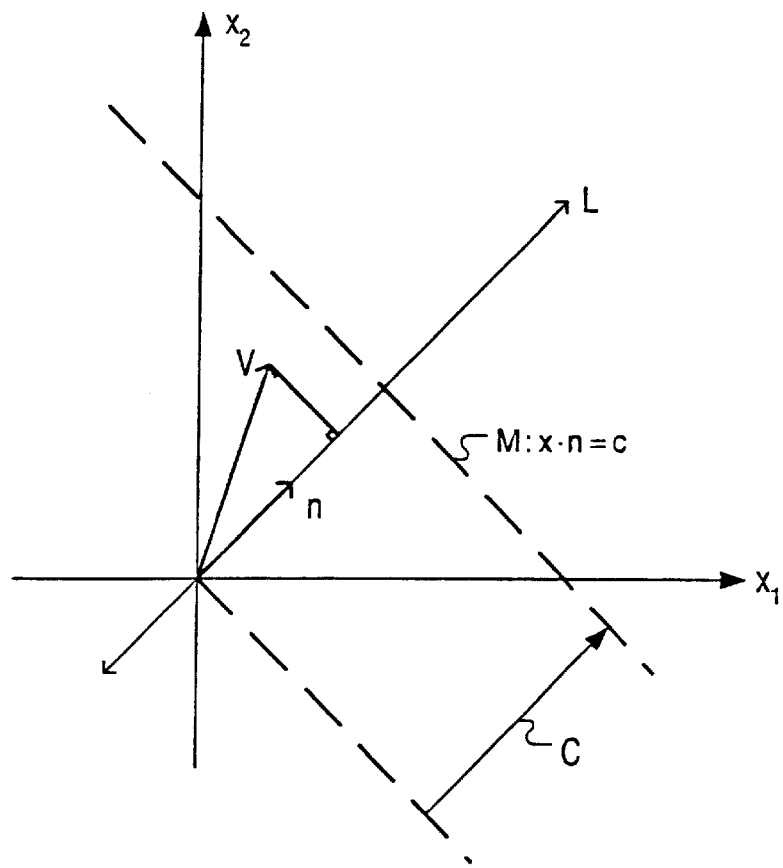
FIG. 5A illustrates the mathematical expressions which describe lines and half-planes in two dimensional space.

Since a hull has a surface which is comprised of a finite number of planar components, the description of a hull is intimately connected to the description of a plane in three-space. In FIG. 5A, a two dimensional example is given from which the equation of an arbitrary plane may be generalized. A unit vector n [any vector suffices but a vector of length one is convenient for discussion] defines a line L through the origin of the two dimensional space. By taking the dot product v·n of a vector v with the unit vector n, one obtains the length of the projection of vector v in the direction defined by unit vector n. Thus, given a real constant c, it follows that the equation x·n=c, where x is a vector variable, defines a line M perpendicular to line L and situated at a distance c from the origin along line L. In the context of three-dimensional space, this same equation defines a plane perpendicular to the line L, again displaced distance c from the origin along line L. Observe that the constant c may be negative, in which case the line (or plane) M is displaced from the origin at distance |c| along line L in the direction opposite to unit vector n.

The line x·n=c divides the plane into two half-planes. By replacing the equality in the above equation with an inequality, one obtains the description of one of these half-planes. The equality x·n<c defines the half-plane which contains the negative infinity end of line L. [The unit vector n defines the positive direction of line L.] In three dimensions, the plane x·n=c divides the three-dimensional space into two half-spaces. The inequality x·n<c defines the half-space which contains the negative infinity end of line L.

Figure 5B:
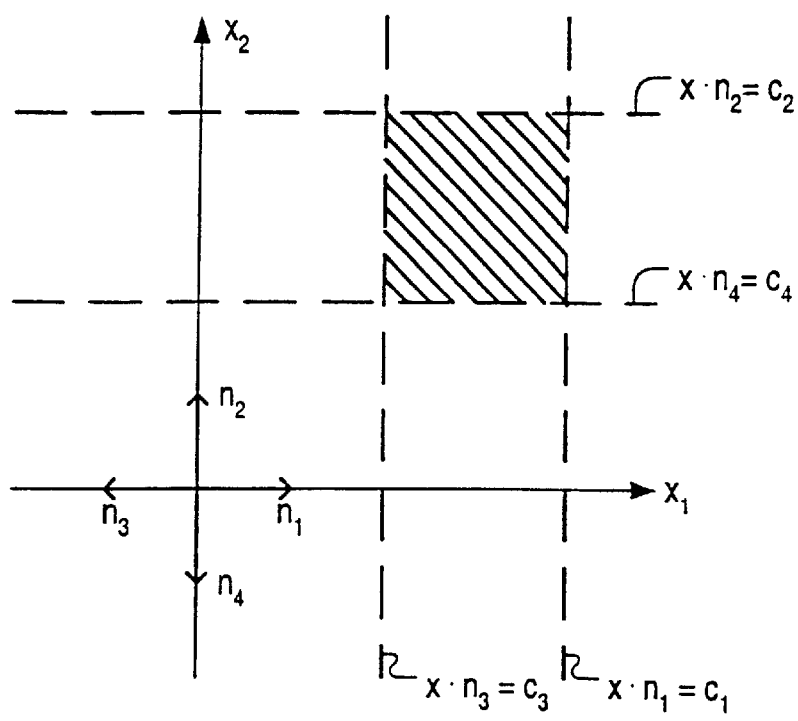
FIG. 5B illustrates the description of a rectangular region as the intersection of four half-planes in a two dimensional space.

FIG. 5B shows how a rectangular region may be defined as the intersection of four half-planes. Given four normal vectors $n_1$ through $n_4$, and four corresponding constants $c_1$ through $c_4$, a rectangular region is defined as the set of points which simultaneously satisfy the set of inequalities $x \cdot n_i < c_i$, where i ranges from one to four. This system of inequalities may be summarized by the matrix-vector expression N·x<c, where the rows of matrix N are the normal vectors $n_1$ through $n_4$, and the components of vector c are the corresponding constants $c_1$ through $c_4$. If the normal vectors are chosen so as to lie in the positive and negative axial directions (as shown in FIG. 5B), the resulting rectangular region has sides parallel to the axes. It is noted that the rectangular hulls H00 through H11 shown in FIG. 4B all use a common set of normal vectors. Thus, each hull is characterized by a unique c vector.

In three-dimensional space, a rectangular box may be analogously defined as the intersection of six half-spaces. Given six normal vectors $n_1$ through $n_6$, oriented in each of the three positive and three negative axial directions, and six corresponding constants $c_1$ through $c_6$, the simultaneous solution of the inequalities $x \cdot n_i < c_i$, where i runs from one to six, defines a rectangular box with sides parallel to the coordinate planes. Thus, a rectangular box may be compactly represented with the same matrix-vector expression Nx<c, where matrix N now has six rows for the six normal vectors, and vector c has six elements for the six corresponding constants.

To construct an object hierarchy, object hulls H00 through H11 are paired together as shown in FIG. 4C. Each pair of object hulls is bounded by a containing hull. For example, hulls H00 and H01 are paired together and bounded by containing hull H0. Containing-hull H0 contains the two component hulls H00 and H01. Likewise, object hulls H10 and H11 are paired together and bounded by containing-hull H1. In addition, two parent nodes are generated in the object hierarchy, one for each of the containing-hulls H0 and H1. For simplicity, the parent nodes are commonly labeled as their corresponding containing-hulls. Thus, parent node H0 points to its children nodes H00 and H01, while parent node H1 points to its children nodes H10 and H11. Each parent node contains the characterizing c vector for the corresponding containing-hull.

The containing-hulls H0 and H1 may be referred to as first order containing-hulls since they are the result of a first pairing operation on the original object hulls. A second pairing operation is applied to the first-order containing hulls to obtain second-order containing-hulls. Each second-order containing-hull contains two first-order hulls. For each of the second-order containing-hulls a parent node is generated in the object hierarchy. The parent node reflects the same parent-child relationship as the corresponding second-order containing-hull. For example, in FIG. 4D, second-order containing-hull H contains first-order containing-hulls H0 and H1. Thus, parent node H in the object hierarchy points to children nodes H0 and H1. Parent node H stores the characterizing vector c for the containing-hull H. In the example presented in FIGS. 4A–4D, the object hierarchy is complete after two pairing operations since the original object collections contained only four objects.

In general, a succession of pairing operations is performed. At each stage, a higher-order set of containing-hulls and corresponding nodes for the object hierarchy are generated. Each node contains the describing vector c for the corresponding containing-hull. At the end of the process, the object hierarchy comprises a binary tree with a single root node. The root node corresponds to a total containing-hull which contains all sub-hulls of all orders including all the original object-hulls. The object hierarchy, because it comprises a hierarchy of bounding hulls, will also be referred to as the hull hierarchy. In the preferred embodiment, the pairing operations are based on proximity, i.e. objects (and hulls of the same order) are paired based on proximity. Proximity based pairing results in a more efficient visible object determination algorithm. This tree of containing hulls provides a computationally efficient, hierarchical representation of the entire scene. For instance, when a cone completely misses a node's containing-hull, none of the node's descendents need to be examined.

Bounding hulls (i.e. containing hulls) serve the purpose of simplifying and approximating objects. Any hierarchy of containing hulls works in principle. However, hierarchies of hulls based on a common set of normal vectors are particularly efficient computationally. A collection of hulls based on a common set of normal vectors will be referred to herein as a fixed-direction or commonly-generated collection. As described above, a polytope hull is described by a bounding system of linear inequalities $\{x:Nx \leq c\}$, where the rows of the matrix N are a set of normal vectors, and the elements of the vector c define the distances to move along each of the normal vectors to obtain a corresponding side of the polytope. In a fixed-direction collection of hulls, the normal matrix N is common to all the hulls in the collection, while the vector c is unique for each hull in the collection. The problem of calculating the coefficient vector c for a containing hull given a collection of subhulls is greatly simplified when a common set of normal vectors is used. In addition, the nodes of the hull hierarchy may advantageously consume less memory space since the normal matrix N need not be stored in the nodes. In some embodiments, the hull hierarchy comprises a fixed-direction collection of hulls.

In a first embodiment, six normal vectors oriented in the three positive and three negative axial directions are used to generate a fixed-direction hierarchy of hulls shaped like rectangular boxes with sides parallel to the coordinate planes. These axis-aligned bounding hulls provide a simple representation that has excellent local computational properties. It is easy to transform or compare two axis-aligned hulls. However, the approximation provided by axis-aligned hulls tends to be rather coarse, often proving costly at more global levels.

In a second embodiment, eight normal vectors directed towards the corners of a cube are used to generate a hierarchy of eight-sided hulls. For example, the eight vectors ($\pm 1$, $\pm 1$, $\pm 1$) may be used to generate the eight-sided hulls. The octahedron is a special case of this hull family.

In a third embodiment, fourteen normal vectors, i.e. the six normals which generate the rectangular boxes plus the eight normals which generate the eight-sided boxes, are used to generate a hull hierarchy with fourteen-sided hulls. These fourteen-sided hulls may be described as rectangular boxes with corners shaved off. It is noted that as the number of normal vectors and therefore side increases, the accuracy of the hull's approximation to the underlying object increases.

In a fourth embodiment, twelve more normals are added to the fourteen normals just described to obtain a set of twenty-six normal vectors. The twelve additional normals serve to shave off the twelve edges of the rectangular box in addition to the corners which have already been shaved off. This results in twenty-six sided hulls. For example, the twelve normal vectors ($\pm 1$, $\pm 1$, 0), ($\pm 1$, 0, $\pm 1$), and (0, $\pm 1$, $\pm 1$) may be used as the additional vectors.

In the examples given above, hulls are recursively grouped in pairs to generate a binary tree. However, in other embodiments, hulls are grouped together in groups of size G, where G is larger than two. In one embodiment, the group size varies from group to group.

Although the above discussion has focussed on the use of polytope hulls as bounds for object and clusters, it is noted that any type of bounding surfaces may be used, thereby generating a hierarchy of bounds referred to herein as a bounding hierarchy or bound tree structure. Each node of the bounding hierarchy corresponds to an object or cluster and stores parameters which characterize the corresponding bound for that object or cluster. For example, polynomial surfaces such as quadratic surfaces may be used to generate bounds for objects and/or clusters. Spheres and ellipsoids are examples of quadratic surfaces.

Cones in Visible Object Determination

In addition to the bounding hierarchy (e.g. hull hierarchy) discussed above, the visualization software makes use of a hierarchy of spatial cones. An initial cone which may represent the view frustum is recursively subdivided into a hierarchy of sub-cones. Then a simultaneous double recursion is performed through the pair of trees (the object tree and cone tree) to rapidly determine the set of visible objects. This cone-based method provides a substantial computational gain over the prior art method based on ray-casting.

Cones discretize the spatial continuum differently than rays. Consider the simultaneous propagation of all possible rays from a point and the ensuing spherical wavefront. The first object encountered by each ray is visible. If consideration is restricted to those rays that form a cone, the same observation still applies. The first object encountered by the cone's wavefront is visible. Now, if the view frustum is partitioned into some number of cones, the objects visible from the viewpoint can be determined up to the resolution of the cones.

Figure 6:
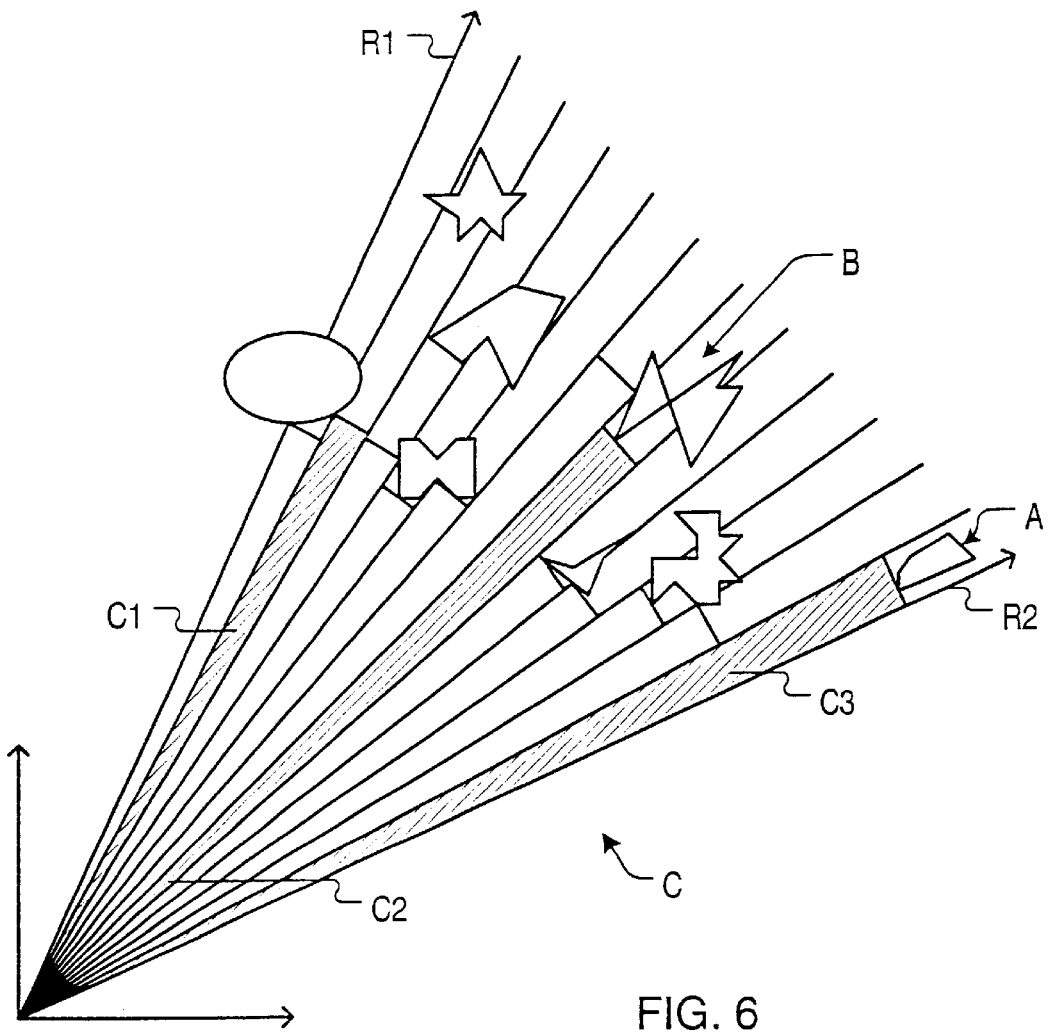
FIG. 6 illustrates a two-dimensional cone partitioned into a number of subcones which interact with a collection of objects by means of wavefronts propagating within each of the subcones.

FIG. 6 illustrates a two-dimensional cone C in a two-dimensional environment. Cone C is defined by the region interior to the rays R1 and R2 (and inclusive of those rays). The cone C is partitioned into a number of sub-cones. The ambient space is populated with a collection of two-dimensional objects. A wavefront propagates within each of the subcones. Each wavefront terminates upon its first interaction with an object. Three of the subcones are especially highlighted, i.e. subcones C1, C2 and C3. Subcone C1 interacts with two objects, i.e. an ellipse and a star shaped object. However, the wavefront propagating within subcone C1 terminates, by definition, upon its first interaction with an object. Since the wavefront interacts with the ellipse first, the wavefront terminates on the ellipse, and the star object is defined to be invisible with respect to this subcone. If higher resolution is desired, subcone C1 may be further partitioned into a set of smaller cones. Some of these smaller cones would then terminate on the ellipse, while others would terminate on the star-shaped object. Subcone C2 interacts with only one object, i.e. object B. The wavefront propagating with subcone C2 terminates at the point of first contact with object B.

It is noted that the cone-based object visibility query (modeled on the wavefront propagation concept) is an inherently spatial computation. Thus, the object visibility query for subcone C3 detects the small object A even though this object lies entirely in the interior of subcone C3. The visibility query computation will be explained in detail later.

Polyhedral Cones

Figure 7:
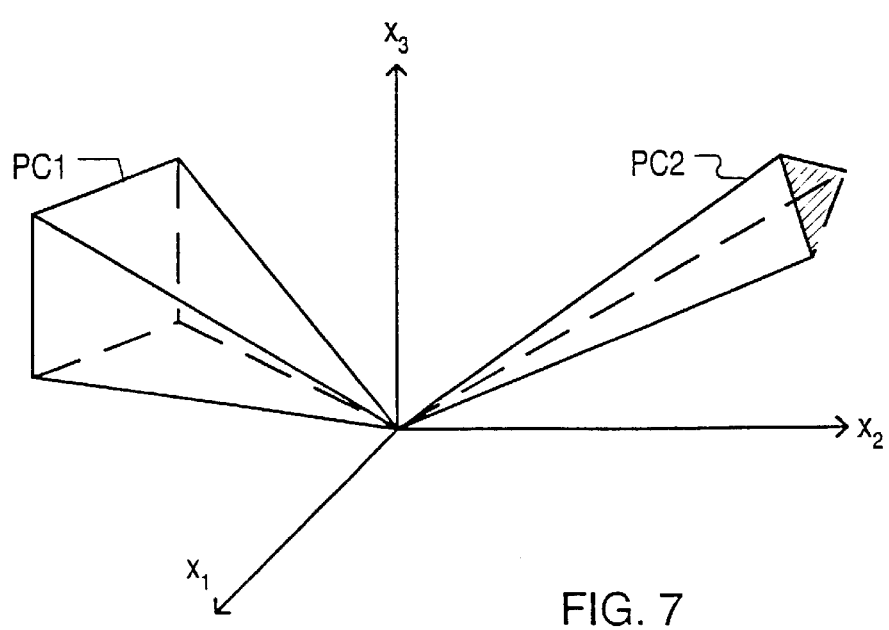
FIG. 7 illustrates polyhedral cones with rectangular and triangular cross-section emanating from the origin.
Figure 8A:
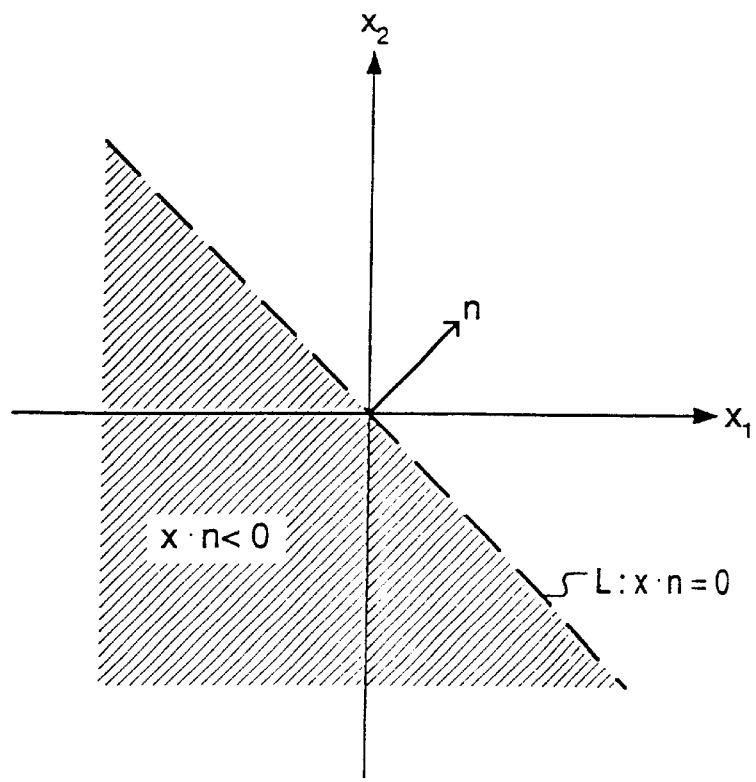
FIG. 8A illustrates mathematical expressions which describe a line through the origin and a corresponding half-plane given a normal vector in two-dimensional space.

The spatial cones used in the preferred embodiment are polyhedral cones. The generic polyhedral cone has a polygonal cross-section. FIG. 7 gives two examples of polyhedral cones. The first polyhedral cone PC1 has a rectangular cross-section, while the second polyhedral cone PC2 has a triangular cross-section. The view frustum is a cone with rectangular cross-section like cone PC1. Polyhedral cones may be defined by homogeneous linear inequalities. Given a normal vector n, the equation $n \cdot x = 0$ involving vector argument x defines a plane passing through the origin and perpendicular to the normal vector n. This plane divides space into two half-spaces. The linear inequality $n \cdot x < 0$ defines the half-space from which the normal vector n points outward. FIG. 8A gives a two-dimensional example. As shown, the equation $n \cdot x = 0$ specifies the set of points (interpreted as vectors) which are perpendicular to normal n. This perpendicular line L divides the plane into two half-planes. The half-plane defined by the inequality $n \cdot x < 0$ is denoted by shading. Observe that the normal vector n points out of this half-plane.

Figure 8B:
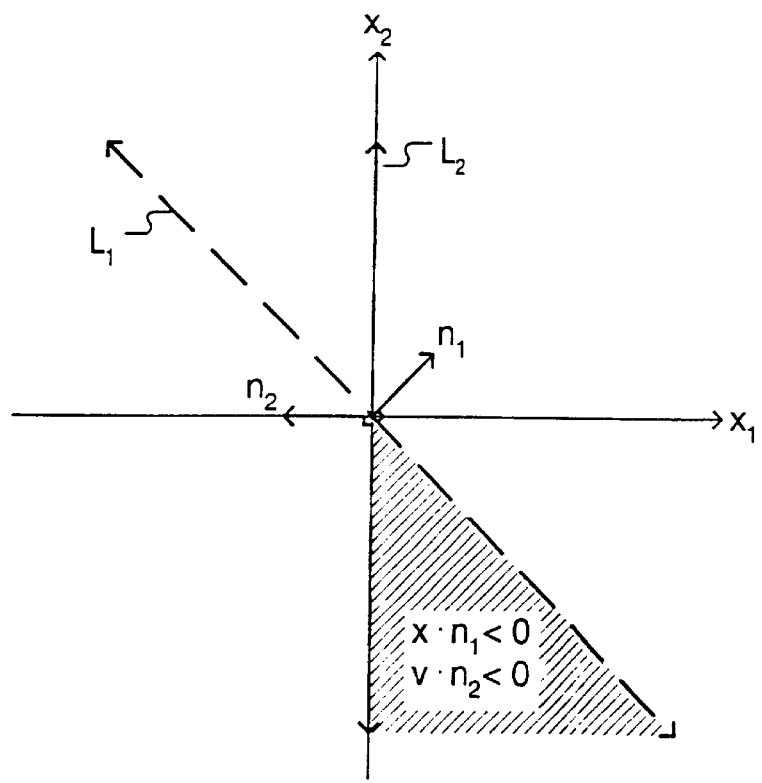
FIG. 8B illustrates the specification of a two-dimensional conic region as the intersection of two half-planes.

A polyhedral cone is constructed by intersection of multiple half-spaces. For example, solid cone PC2 of FIG. 7 is the intersection of three half-spaces. Similarly, solid cone PC1 is the intersection of four half-spaces. FIG. 8B provides a two-dimensional example of intersecting half-planes to generate a conic area. The two normal vectors $n_1$ and $n_2$ define perpendicular lines $L_1$ and $L_2$ respectively. The inequality $n_1 \cdot x < 0$ specifies the half-plane which is southwest (i.e. left and below) of the line $L_1$. The inequality $n_2 \cdot x < 0$ defines the half-plane which is to the right of line $L_2$. The solution to the simultaneous system of inequalities $n_1 \cdot x < 0$ and $n_2 \cdot x < 0$ is the intersection region denoted in shading. This system of inequalities may be summarized by the matrix equation $Sx \leq 0$, where the rows of matrix S are the normal vectors. From this discussion, it may be observed that solid cone PC1 of FIG. 7 is determined by four normal vectors. The normal matrix S would then have four rows (for the four normal vectors) and three columns corresponding to the dimension of the ambient space.

Thus, a polyhedral cone emanating from the origin is defined as the set of points satisfying a system of linear inequalities $Sx \leq 0$. [There is no loss of generality in assuming the origin to be the viewpoint.] According to this definition, half-spaces, planes, rays, and the origin itself may be considered as polyhedral cones. In addition, the entire space may be considered to be a polyhedral cone, i.e. that cone which is defined by an empty matrix S.

Distance Measurement

In view of the discussion concerning wave propagation, the distance of an object, hull, or bound from a particular viewpoint is defined to be the minimum distance to the object, hull, or bound from the viewpoint. So, assuming a viewpoint at the origin, the distance of the object, hull, or bound X from the viewpoint is defined as $$f(X) = \min_{x \in X} \|x\|,$$

where $\|x\|$ is the norm of vector x. When the object, hull, or bound X is empty, the distance may be taken to be positive infinity.

Any vector norm may be chosen for the measurement of distance. In one embodiment, the Euclidean norm is chosen for distance measurements. The Euclidean norm results in a spherically shaped wavefront. Any wavefront shape may be used as long as it satisfies a mild "star-shape" criterion, i.e. the entire boundary of the wavefront is unobstructed when viewed from the origin. All convex wavefronts satisfy this condition, and many non-convex ones do as well. In general, the level curves of a norm are recommended as the wavefront shapes. From a computational standpoint, the spherical wavefront shape given by the $L^2$ norm, and the piecewise-linear wavefront shapes given by the $L^1$, and $L^\infty$ norms provide good choices for visibility detection. Not surprisingly, piecewise-linear approximations of such norms exhibit computational advantages. FIG. 6 illustrates a piecewise-linear approximation to the $L_2$ norm in so far as the spherical wavefronts have been "squared off".

Cones and Visibility

From a viewpoint located within a large set of objects, there exists at least one point (on some object) nearest to the viewpoint. Since that point (or set of points) is closest to the viewpoint, nothing can occlude the view of that point (or those points). This implies that the object (or objects) containing the nearest point (or points) is (are) at least partially visible.

Now, consider an arbitrary cone K emanating from the origin as a viewpoint. The unobstructed visibility argument holds even if all distance measurements are restricted to points that fall within the cone. Define the distance of an object, hull, or bound X-relative to the cone K as $$f_K(X) = \min_{x \in X \cap K} \|x\|.$$

If the distance $f_K$ is computed for each object X in a scene, the nearest object, i.e. the object which achieves a minimum distance value, is visible with respect to cone K. In fact, an object X is visible if and only if there exists a cone K such that (a) $f_K(X)$ is finite and (b) $f_K(X) \leq f_K(Y)$ holds for all objects Y in the set of objects.

It is noted that rays may be viewed as degenerate cones that emanate from the viewpoint and pass through the center of each pixel. The nearest object along each ray is visible and thus determines the value of the corresponding pixel. Similarly, it is possible to construct cones which emanate from the viewpoint and cover each pixel. For example, two or more cones with triangular cross-section may neatly cover the area of a pixel. The nearest object within each cone is visible and contributes to the value of the corresponding pixel.

As discussed above, the ray-based methods of the prior art are able to detect objects only up the resolution of the ray sample. Small visible objects or small portions of larger objects may be missed entirely due to insufficient ray density. In contrast, cones can completely fill space. Thus, the cone-based method disclosed herein may advantageously detect small visible objects or portions of objects that would be missed by a ray-based method with equal angular resolution.

Generalized Separation Measurement

For the purposes of performing a visibility search procedure, it is necessary to have a method for measuring the extent of separation (or conversely proximity) of objects, bounds, or hulls with respect to cones. There exists a great variety of such methods in addition to those based on minimizing vector norms defined above. As alluded to above, a measurement value indicating the extent of separation between a set X and a cone K may be obtained by propagating a wavefront internal to the cone from the vertex of the cone and observing the radius of first interaction of the internal wavefront with the set X. As mentioned above, the wavefront may satisfy a mild "star shape" condition: the entire boundary of the wavefront is visible from the vertex of the cone.

In one embodiment, the measurement value is obtained by computing a penalty of separation between the set X and the cone K. The penalty of separation is evaluated by minimizing an increasing function of separation distance between the vertex of the cone K and points in the intersection of the cone K and set X. For example, any positive power of a vector norm gives such an increasing function.

In another embodiment, the measurement value is obtained by computing a merit of proximity between the set X and the cone K. The merit of proximity is evaluated by maximizing a decreasing function of separation distance between the vertex of the cone K and points in the intersection of the cone K and set X. For example, any negative power of a vector norm gives such a decreasing function.

A Cone Hierarchy

In some embodiment, the visibility determination method uses a hierarchy of cones in addition to the hierarchy of hulls described above. The class of polyhedral cones is especially well suited for generating a cone hierarchy: polyhedral cones naturally decompose into polyhedral subcones by the insertion of one or more separating planes. The ability to nest cones into a hierarchical structure allows a rapid examination of object visibility. As an example, consider two neighboring cones that share a common face. By taking the union of these two cones, a new composite cone is generated. The composite cone neatly contains its children, and is thus capable of being used in querying exactly the same space as its two children. In other words, the children cones share no interior points with each other and they completely fill the parent without leaving any empty space.

A typical display and its associated view frustum has a rectangular cross-section. There are vast array of possibilities for tessellating this rectangular cross-section to generate a system of sub-cones. For example, the rectangle naturally decomposes into four rectangular cross-sections, or two triangular cross-sections. Although these examples illustrate decompositions using regular components, irregular components may be used as well.

Figure 9A:
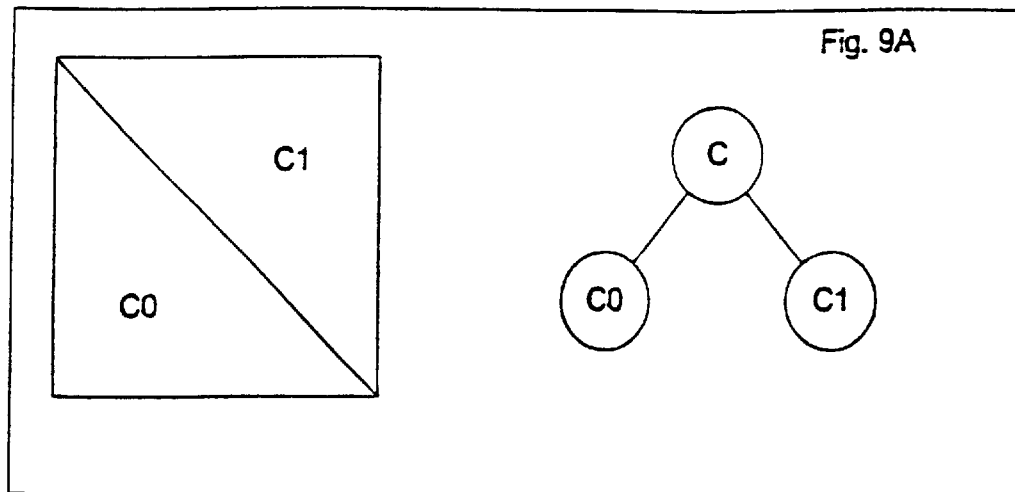
FIGS. 9A–9C illustrate the formation of a cone hierarchy based on repeated subdivision of an initial cone with rectangular cross-section.
Figure 9B:
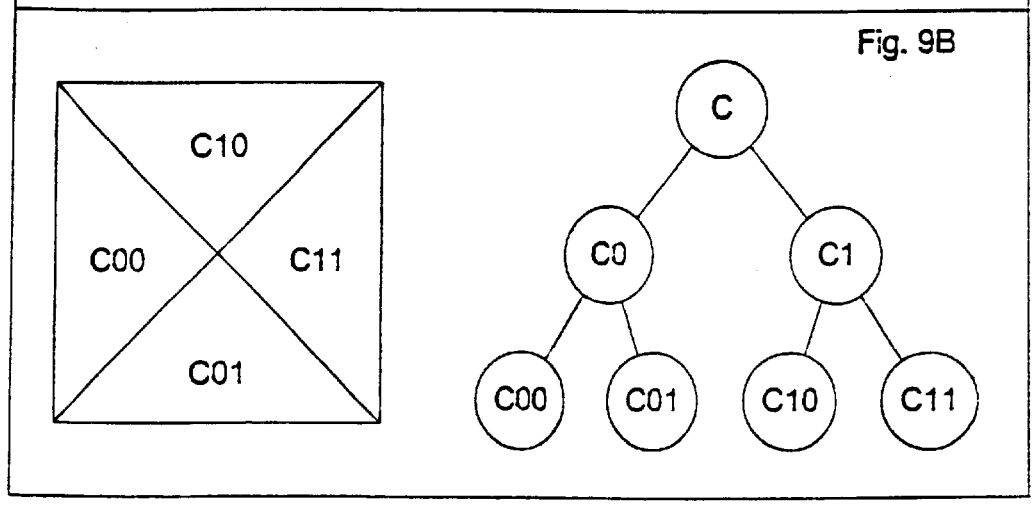
Figure 9C:
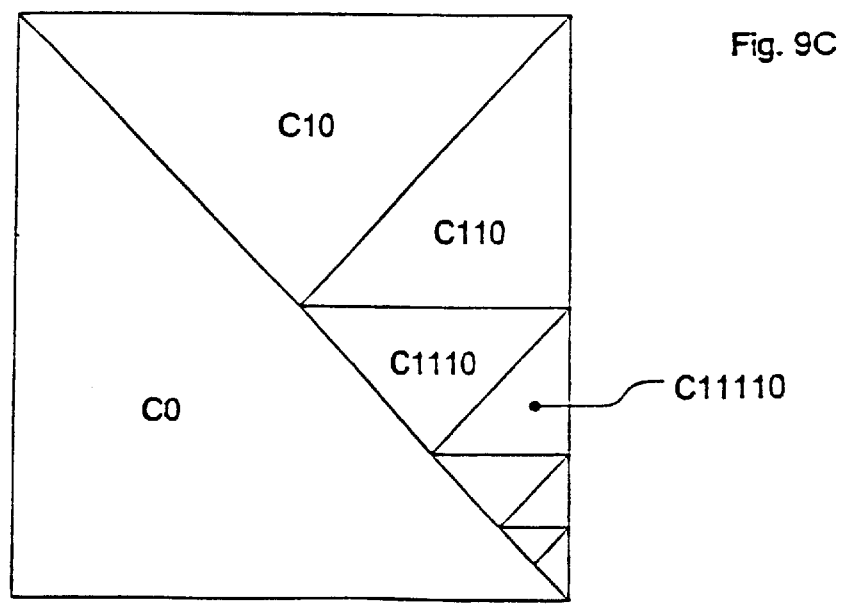

FIGS. 9A–9C illustrate a hierarchical decomposition of an initial view frustum C. FIG. 9A depicts the rectangular cross-section of the view frustum and its bisection into two cones with triangular cross-section, i.e. cones C0 and C1. The view frustum C corresponds to the root node of a cone tree. Cones and their corresponding nodes in the cone tree are identically labeled for simplicity. Each node of the cone tree stores the matrix S of normal vectors which generate the corresponding cone. The root node points to two children nodes corresponding to cones C0 and C1. FIG. 9B illustrates a second decomposition stage. Each of the cones C0 and C1 is bisected into two sub-cones (again with triangular cross-section). Cone C0 decomposes into the two sub-cones C00 and C01. Likewise, cone C1 is bisected into two sub-cones C10 and C11. Nodes are added to the cone tree to reflect the structure of this decomposition. The parent-child relation of nodes in the cone tree reflects the superset-subset relation of the respective cones in space. FIG. 9C illustrates the pattern of successive cone bisections according to one embodiment. Each cone in the hierarchy may be decomposed into two sub-cones by means a bisecting plane. FIG. 9C illustrates several successive descending bisections which generate cones C0, C10, C110, and C1110, and so on. The initial cone C (i.e. the view frustum) may be decomposed to any desired resolution. In one embodiment, the bisections terminate when the resultant cones intercept some fraction of a pixel such as, for example, ½ a pixel. The corresponding terminal nodes of the cone tree are called leaves. Alternate embodiments are contemplated where the bisections terminate when the resultant leaf-cones intercept areas which subtend (a) a portion of pixel such as 1/N where N is a positive integer, or (b) areas including one or more pixels.

The triangular hierarchical decomposition shown in FIGS. 9A–9C has a number of useful properties. By decomposing the original rectangular cone based on recursive bisection, a binary tree of cones of arbitrary depth is generated. Triangular cones have the fewest sides making them computational more attractive. In addition, triangular cones can also tessellate the entire space surrounding the viewpoint. Image a unit cube with viewpoint at the center. The root cone may be the entire space. The root cone may have six subcones which intercept the six corresponding faces of the cube. Thus, it is possible to create a hierarchical cone representation for the entire space surrounding the viewpoint.

It is noted that any cone decomposition strategy may be employed to generate a cone hierarchy. In a second embodiment, the view frustum is decomposed into four similar rectangular cones; each of these subcones is decomposed into four more rectangular subcones, and so on. This results in a cone tree with four-fold branches.

Discovering the Set of Visible Objects

Once the hull hierarchy and the cone hierarchy have been constructed, the set of visible objects may be computed with respect to the current viewpoint. In one embodiment, the visible object set is repeatedly recomputed for a succession of viewpoints, viewing directions, video frames, etc. The successive viewpoints and/or viewing directions may be specified by a user through an input device such as a mouse, joystick, keyboard, trackball, head-position sensor, eye-orientation sensor, or any combination thereof. The visible object determination method may be organized as a simultaneous search of the hull tree and the cone tree. The search process may involve recursively performing cone-hull queries. Given a cone node K and a hull node H, a cone-hull query on cone K and hull H investigates the visibility of hull H and its descendent hulls with respect to cone K and its descendent cones. The search process has a computational complexity of order log M, where M equals the number of cone nodes times the number of hull nodes. In addition, many cone-hull queries can occur in parallel allowing aggressive use of multiple processors in constructing the visible-object-set.

Viewing the Scene

Independently, and also concurrently, the set of visible objects from the current viewpoint may be rendered on one or more displays. The rendering can occur concurrently because the visible-object-set remains fairly constant between frames in a walkthrough environment. Thus the previous set of visible objects provides an excellent approximation to the current set of visible objects.

Managing the Visible-object-set

The visualization software may manage the visible-object-set. Over time, as an end-user navigates through a model, just inserting objects into the visible object set would result in a visible object set that contains too many objects. To ensure good rendering performance, the visualization process may remove objects from the visible object set when those objects no longer belong to the set—or soon thereafter. A variety of solutions to object removal are possible. One solution is based on object aging. The system removes any object from the visible object set that has not been rediscovered by the cone query within a specified number of redraw cycles.

Computing Visibility Using Cones

Substantial computational leverage is provided by recursively searching the hierarchical tree of cones in conjunction with the hierarchical tree of hulls. Whole groups of cones may be tested against whole groups of hulls in a single query. For example, if a parent cone does not intersect a parent hull, it is obvious that no child of the parent cone can intersect any child of the parent hull. In such a situation, the parent hull and all of its descendants may be removed from further visibility considerations with respect to the parent cone.

Visibility Search Algorithm

In the preferred embodiment, the visibility search algorithm may be realized by a visibility search program. The visibility search program may be stored in memory 106 and/or a memory resident within graphics accelerator 112. Hereinafter, the terms visibility search program and visibility search algorithm will be used interchangeably. The visibility search program performs a recursive search of the two trees (the object tree and the cone tree) to assign visible objects to each of the leaf cones of the cone tree. The host processor 102 may execute the visibility search program. In an alternate embodiment, the visibility search program executes on a processor comprised within graphics accelerator 112.

The recursive search of the two trees provides a number of opportunities for aggressive pruning of the search space. Central to the search is the object-cone distance measure defined above, i.e. given a cone K and an object (or hull) X, the object-cone distance is defined as $$f_K(X) = \min_{x \in X \cap K} \|x\|.$$

It is noted that this minimization is in general a nonlinear programming problem since the cones and object hulls are defined by constraint equations, i.e. planes in three-space. If the vector norm $\|x\|$ is the $L^1$ norm (i.e. the norm defined as the sum of absolute values of the components of vector x), the nonlinear programming problem reduces to a linear programming problem. If the vector norm $\|x\|$ is the Euclidean norm, the nonlinear programming problem reduces to a quadratic programming problem. Given a collection of objects, the object X which achieves the smallest distance $f_K(X)$ with respect to cone K is closest to the cone's viewpoint, and therefore is at least partially visible.

The recursive search starts with the root H of the hull tree and the root cone C of the cone tree (see FIGS. 4 and 9). Remember that each node of the hull tree specifies a bounding hull which contains the hulls of all its descendant nodes. Initially the distance between the root cone and the root hull is computed. If that distance is infinite, then no cone in the cone hierarchy intersects any hull in the hull hierarchy and there are no visible objects. If the distance is finite, then further searching may be performed. Either tree may be refined at this point.

The pruning mechanism is built upon several basic elements. A distance measurement function computes the distance $f_K(X)$ of a hull X from the viewpoint of a cone K. In other words, the distance measurement function determines the cone-restricted distance to the hull X. In some embodiments, the minimization associated with evaluating the distance measurement function is implemented by solving an associated linear (or non-linear) programming problem.

To facilitate the search process, each leaf-cone, i.e. each terminal node of the cone tree, is assigned an extent value which represents its distance to the closest known object-hull. [An object-hull is a hull that directly bounds an object. Object-hulls are terminal nodes of the hull tree.] Thus, this extent value may be referred to as the visibility distance. The visibility distance of a leaf-cone is non-increasing, i.e. it decreases as closer objects (i.e. object hulls) are discovered in the search process. Visibility distances for all leaf-cones are initialized to positive infinity. In addition to a visibility distance value, each leaf-cone node is assigned storage for a currently visible object. This object attribute may be initialized with a reserved value denoted NO_OBJECT which implies that no object is yet associated with the leaf-cone. In another embodiment, the object attribute may be initialized with a reserved value denoted BACKGROUND which implies that a default scene background is associated with the leaf-cone.

In addition, each non-leaf cone, i.e. each cone at a non-final refinement level, is assigned an extent value which equals the maximum of the extent values of its sub-cones. Or equivalently, the extent value for a non-leaf cone equals the maximum of the visibility distance values of its leaf-cone descendents. These extent values are also referred to as visibility distance values. The visibility distance values for all non-leaf cones are initialized to positive infinity also (consistent with initialization of the leaf-cones). Suppose a given non-leaf cone K and a hull X achieve a cone-object distance $f_K(X)$. If this distance $f_K(X)$ is greater than the visibility distance value of the cone K, then all of the leaf-cone descendents of cone K already have known objects closer than the hull H. Therefore, less benefit may be gained by searching hull H against cone K and its descendents. In contrast, if a hull H achieves a distance $f_K(X)$ from cone K which is less than the visibility distance value of cone K, it is possible that hull H contains objects which will strictly decrease the visibility distance of some leaf-cone descendent of cone K. Thus, the hull H and its descendents may be searched against cone K and its descendents.

The following code fragment illustrates the beginning of the search process according to one embodiment of the visibility search algorithm. The variables hullTree and coneTree point to the root nodes of the hull tree and cone tree respectively.

```
main(hullTree, coneTree) {
    cone.extent = infinity;
    distance = Dist(hullTree, coneTree);
    if(distance < infinity)
        findVisible(hullTree, coneTree, distance);
}
```

The function Dist evaluates the distance between the root hull and the root cone. If this distance is less than positive infinity, the function findVisible is called with the root hull, root cone, and their hull-cone distance as arguments. The function findVisible performs the recursive search of the two trees.

Figure 10A:
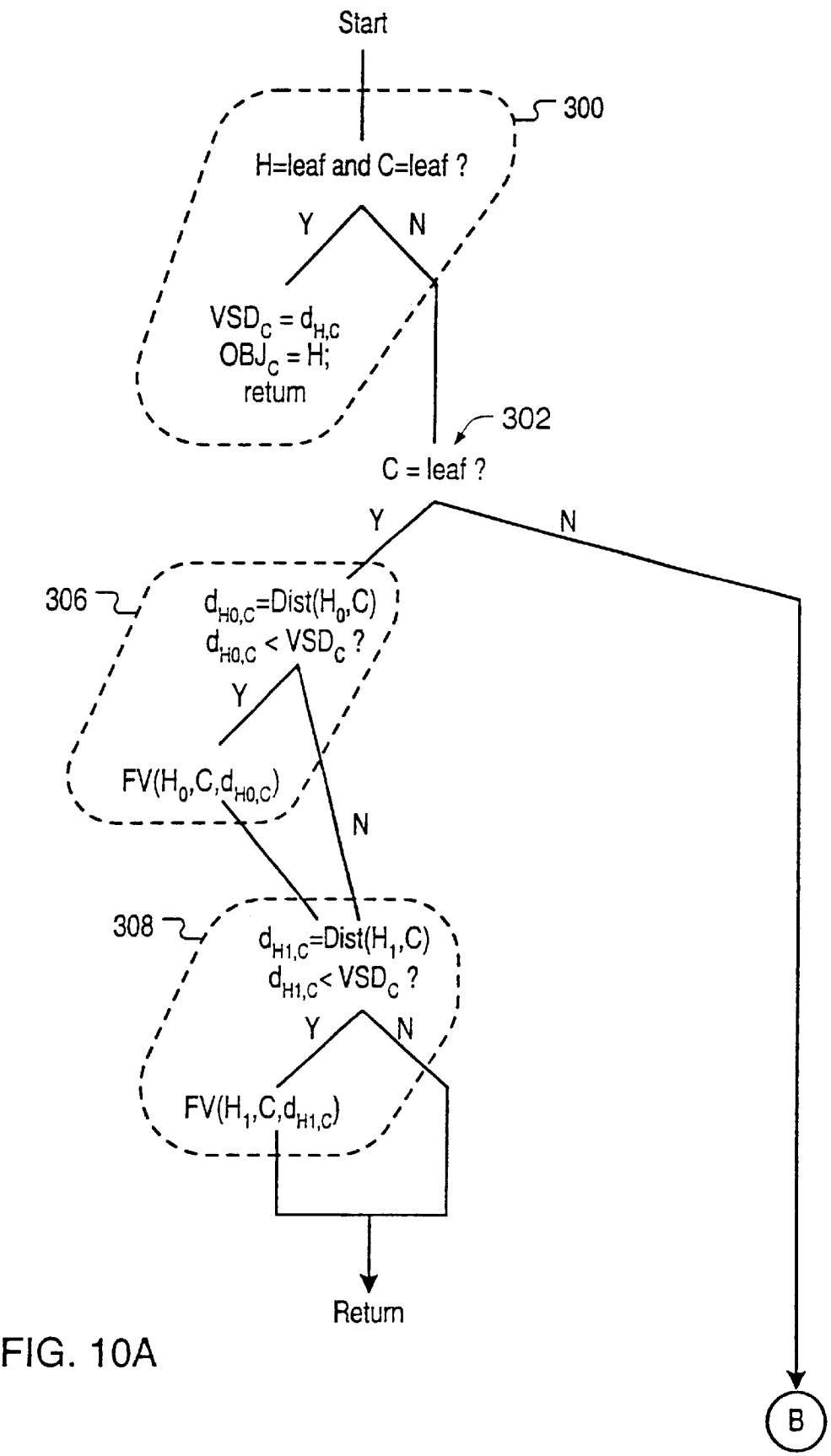
FIGS. 10A–C illustrates one embodiment of a visibility search program for determining a set of visible objects in a graphics environment.
Figure 10B:
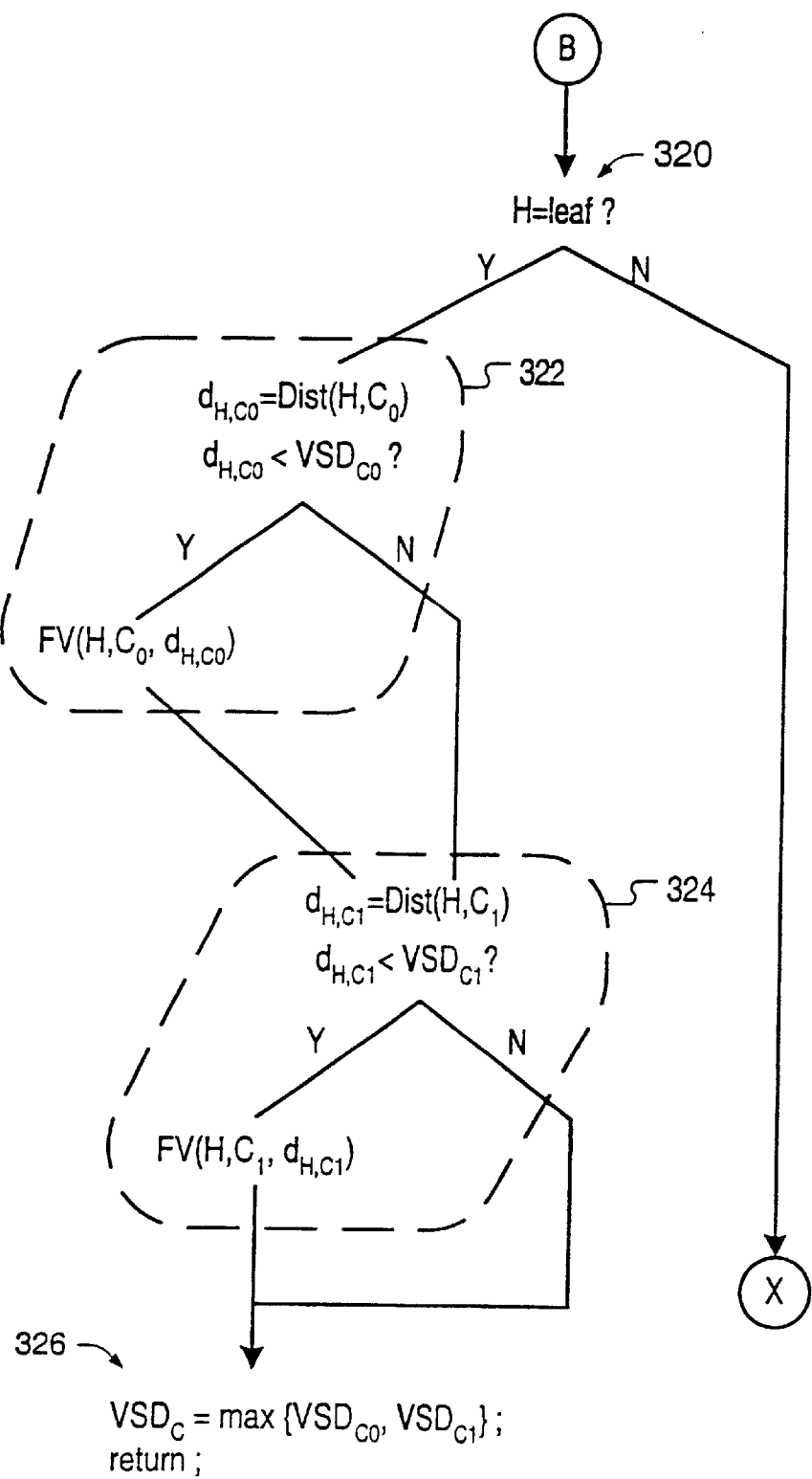
Figure 10C:
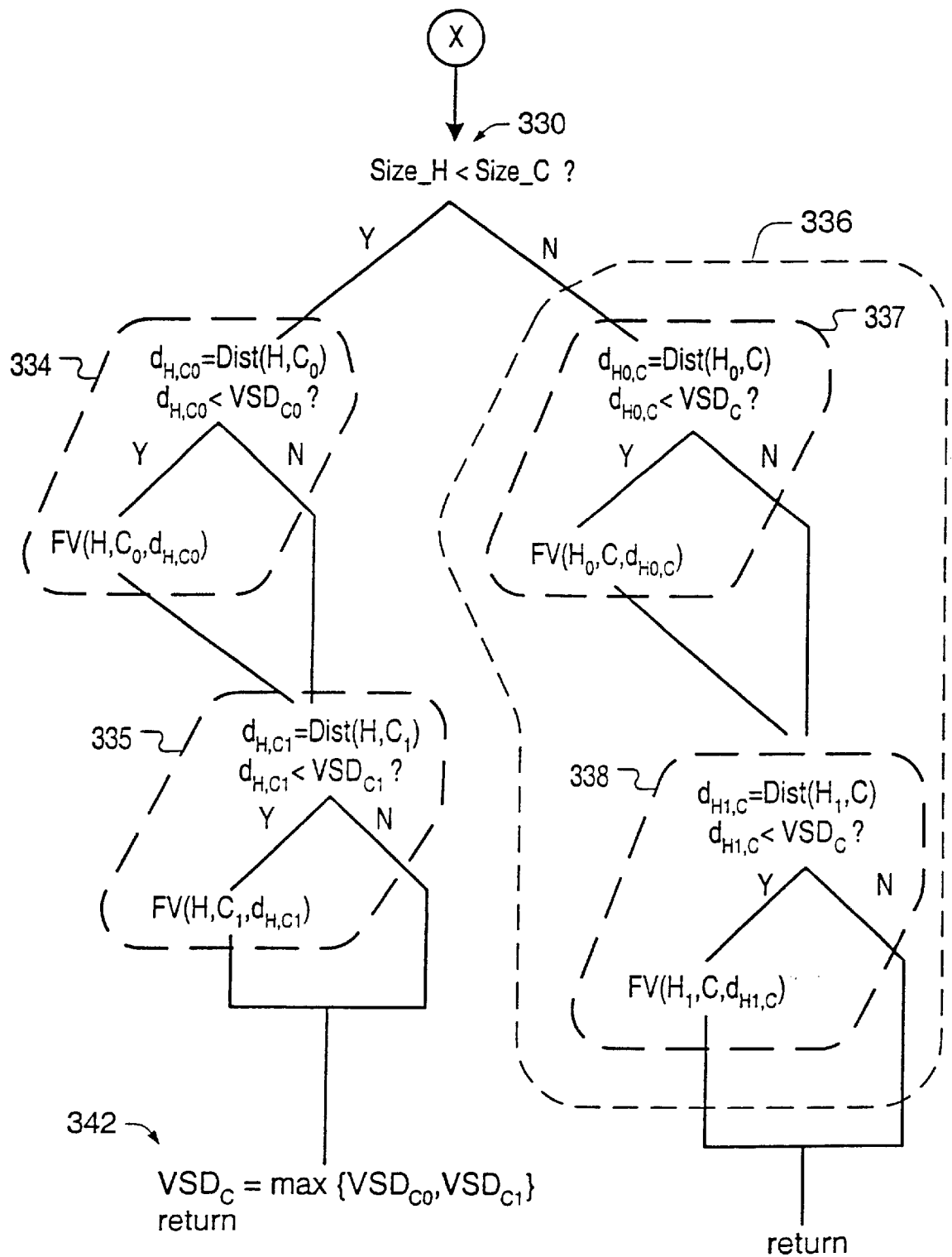

FIGS. 10A–10C illustrate one embodiment of the findVisible function (also referred to by the contraction FV). The findVisible function receives several input variables from a calling routine as illustrated by the following function prototype:

findVisible(H, C, $d_{H,C}$), where H is a hull node to be explored against the cone node C. The value $d_{H,C}$ represents the cone-hull distance between cone C and hull H.

In step 300, the findVisible function determines whether the cone C and hull H are both leaf nodes, i.e. terminal nodes of their respective trees. If so, the visibility distance value $VSD_C$ for the leaf-cone C may be set equal to the distance $d_{H,C}$ of object hull H with respect to cone C. In addition, the object attribute $OBJ_C$ of leaf-cone C may be set equal to the pointer (e.g. memory address) for hull H. Control may then be returned to the calling routine.

If the hull H and cone C are not both leaves, step 302 may be performed. In step 302, the findVisible function may determine if the cone C is a leaf node of the cone tree. If so, steps 306 and 308 may be performed.

In step 306, the findVisible function may invoke the distance function Dist to compute the cone-hull distance $d_{H0,C}$ of the subhull H0 from the origin of leaf cone C. [The children of hull H will be referred to as H0 and H1.] The findVisible function may compare the cone-hull distance $d_{H0,C}$ to the visibility distance value $VSD_C$ of leaf cone C. If the cone-hull distance $d_{H0,C}$ is smaller than the visibility distance value $VSD_C$, the findVisible function may be called again in order to search subhull H0 against leaf cone C. The cone-hull distance $d_{H0,C}$ may be provided as the distance argument for the function call. If the cone-hull distance $d_{H0,C}$ is not less than the current visibility distance, step 308 may be performed.

In step 308, the findVisible function may invoke the distance function Dist to compute the cone-hull distance $d_{H1,C}$ of the subhull H1 from the origin of leaf cone C. The findVisible function may compare the cone-hull distance $d_{H1,C}$ to the visibility distance value $VSD_C$ of leaf cone C. If the cone-hull distance $d_{H1,C}$ is smaller than the visibility distance value $VSD_C$, the findVisible function may be called again in order to search subhull H1 against leaf cone C. The cone-hull distance $d_{H1,C}$ may be provided as the distance argument for the function call. If the cone-hull distance $d_{H1,C}$ is not less than the visibility distance value $VSD_C$, control returns to the calling program.

If, in step 302, it is determined that cone C is not a leaf, step 320 may be performed as indicated in FIG. 10B. In step 320, the findVisible function determines if the hull node H is a leaf node, i.e. an object hull, of the hull hierarchy. If so, the children of cone C may be explored with respect to object hull H in steps 322 and 324. In one embodiment, cone C has two children which are referred to as subcone C0 and subcone C1. In some alternative embodiments, the generic cone may have more than two children.

In step 322, the ƒindVisible function may invoke the distance function Dist to compute the cone-hull distance $d_{H,C0}$ of the hull H from the origin of the subcone C0. The ƒindVisible function may compare the cone-hull distance $d_{H,C0}$ to the visibility distance value $VSD_{C0}$ of subcone C0. If the cone-hull distance $d_{H,C0}$ is smaller than the visibility distance value $VSD_{C0}$ of subcone C0, the ƒindVisible function may be called again in order to search hull H with respect to subcone C0. Thus, hull H, subcone C0 and the cone-hull distance $d_{H,C0}$ may be supplied to the ƒindVisible function as arguments. When the ƒindVisible function returns, control passes to step 324. Furthermore, if the cone-hull distance $d_{H,C0}$ is greater than or equal to the visibility distance value $VSD_{C0}$ of subcone C0, control passes to step 324.

In step 324, the ƒindVisible function may invoke the distance function Dist to compute the cone-hull distance $d_{H,C1}$ of the hull H from the origin of the subcone C1. The ƒindVisible function may compare the cone-hull distance $d_{H,C1}$ to the visibility distance value $VSD_{C1}$ of subcone C1. If the cone-hull distance $d_{H,C1}$ is smaller than the visibility distance value $VSD_{C1}$ of subcone C1, the ƒindVisible function may be called again in order to search hull H with respect to subcone C1. Thus, hull H, subcone C1 and the cone-hull distance $d_{H,C1}$ may be supplied to the ƒindVisible function as arguments. When the ƒindVisible function returns, control passes to step 326. Furthermore, if the cone-hull distance $d_{H,C1}$ is greater than or equal to the visibility distance value $VSD_{C1}$ of subcone C1, control passes to step 326.

Since the visibility distance values for subcones C0 and C1 may have decreased by the interactions with hull H in steps 322 and 324 respectively, the visibility distance value for cone C may be updated. Thus, in step 326, the visibility distance value $VSD_C$ for cone C may be set equal to the maximum of the visibility distance values $VSD_{C0}$ and $VSD_{C1}$ of subcones C0 and C1 respectively. After step 326, program control returns to the calling routine.

If, in step 320, the hull node H is determined not to be a leaf node, the ƒindVisible function may perform step 330 (see FIG. 10C). Thus, step 330 and succeeding steps may assume that neither hull H nor cone C are leaf nodes in their respective hierarchies.

In step 330, the ƒindVisible function may compute a normalized size Size_H for the hull H and a normalized size Size_C for the cone C, and may compare Size_H and Size_C. A variety of methods are contemplated for computing the hull size and cone size. If Size_H is smaller than Size_C, the subcones of cone C may be explored with respect to hull H in steps 334 and 335. If Size_H is greater than Size_C, the subhulls of hull H may be explored with respect to cone C in step 336 which comprises steps 337 and 338. In other embodiments of step 330, a function of Size_H may be compared to function of Size_C.

In step 334, the ƒindVisible function may invoke the distance function Dist to compute the cone-hull distance $d_{H,C0}$ of the hull H from the origin of the subcone C0. The ƒindVisible function may compare the cone-hull distance $d_{H,C0}$ to the visibility distance value $VSD_{C0}$ of subcone C0. If the cone-hull distance $d_{H,C0}$ is smaller than the visibility distance value $VSD_{C0}$ of subcone C0, the ƒindVisible function may be called again in order to search hull H with respect to subcone C0. Thus, hull H, subcone C0 and the cone-hull distance $d_{H,C0}$ may be supplied to the ƒindVisible function as arguments. When the ƒindVisible function returns, control passes to step 335. Furthermore, if the cone-hull distance $d_{H,C0}$ is greater than or equal to the visibility distance value $VSD_{C0}$ of subcone C0, control passes to step 335.

In step 335, the ƒindVisible function may invoke the distance function Dist to compute the cone-hull distance $d_{H,C1}$ of the hull H from the origin of the subcone C1. The ƒindVisible function may compare the cone-hull distance $d_{H,C1}$ to the visibility distance value $VSD_{C1}$ of subcone C1. If the cone-hull distance $d_{H,C1}$ is smaller than the visibility distance value $VSD_{C1}$ of subcone C1, the ƒindVisible function may be called again in order to search hull H with respect to subcone C1. Thus, hull H, subcone C1 and the cone-hull distance $d_{H,C1}$ may be supplied to the ƒindVisible function as arguments. When the ƒindVisible function returns, control passes to step 342. Furthermore, if the cone-hull distance $d_{H,C1}$ is greater than or equal to the visibility distance value $VSD_{C1}$ of subcone C1, control passes to step 342.

In step 342, the visibility distance value $VSD_C$ of cone C may be updated with the maximum of the visibility distance values $VSD_{C0}$ and $VSD_{C1}$ of subcones C0 and C1 respectively. After step 342, program control returns to the calling routine.

If Size_H is greater than (or greater than or equal to) Size_C, the subhulls of hull H may be explored with respect to cone C in step 336 which comprises steps 337 and 338.

In step 337, the ƒindVisible function may invoke the distance function Dist to compute the cone-hull distance $d_{H0,C}$ of the subhull H0 from the origin of the cone C. The ƒindVisible function may compare the cone-hull distance $d_{H0,C}$ to the visibility distance value $VSD_C$ of cone C. If the cone-hull distance $d_{H0,C}$ is smaller than the visibility distance value $VSD_C$ of cone C, the ƒindVisible function may be called again in order to search subhull H0 with respect to cone C. Thus, subhull H0, cone C and the cone-hull distance $d_{H0,C}$ may be supplied to the ƒindVisible function as arguments. When the ƒindVisible function returns, control passes to step 338. Furthermore, if the cone-hull distance $d_{H0,C}$ is greater than or equal to the visibility distance value $VSD_C$ of cone C, control passes to step 338.

In step 338, the ƒindVisible function may invoke the distance function Dist to compute the cone-hull distance $d_{H1,C}$ of the subhull H1 from the origin of cone C. The ƒindVisible function may compare the cone-hull distance $d_{H1,C}$ to the visibility distance value $VSD_C$ of cone C. If the cone-hull distance $d_{H1,C}$ is smaller than the visibility distance value $VSD_C$ of cone C, the ƒindVisible function may be called again in order to search subhull H1 with respect to cone C. Thus, subhull H1, cone C and the cone-hull distance $d_{H1,C}$ may be supplied to the ƒindVisible function as arguments. When the ƒindVisible function returns, control returns to a calling routine.

As explained above, the visibility distance value assigned to each cone in the cone tree is set equal the maximum of the visibility distance values assigned to its subcone children. Thus, if a given hull achieves a distance to a cone which is larger than the cone's current visibility distance value, all of the cone's leaf-cone descendents have already "discovered" objects closer than the given hull and any of its leaf-hull descendents. The given hull node may not be searched with respect to this cone.

A cone's visibility distance value decreases as the recursion tests more and more object-cone leaf pairs. As nearby objects are discovered, a cone's visibility distance value decreases and the probability of skipping unpromising hull nodes increases. A leaf in the hull tree bounds the volume of the associated object and also approximates that object's contents. Thus, cone visibility distance values, set during recursion, are usually not the real distances to objects but a conservative approximation of those distances. If the conservative approximation is inadequate for use in an application, then that application can invoke a higher precision computation of object-cone distance to determine the visibility distance values.

Throughout the above discussion of the visibility search algorithm it has been assumed that the function Dist used to compute cone-hull separation distance is based on minimizing an increasing function of separation distance between the vertex of the given cone and points in the intersection of the given cone and the given bound/hull. However, it is noted that the function Dist may be programmed to compute a merit of proximity between a given cone and given bound/hull. The resulting merit value increases with increasing proximity and decreases with increasing separation, converse to the typical behavior of a distance function. In this case, the visibility search algorithm performs a search of bound/hull H against cone K only if the merit value of separation between cone K and bound/hull H is greater than the current merit value associated with cone K. Furthermore, after a search of subcones of cone K is completed, the merit value associated with the cone K is updated to equal the minimum of the merit values of its subcone children.

In general, the function Dist determines a cone-hull measurement value of separation by computing the extremum (i.e. minimum or maximum) of some monotonic (increasing or decreasing) function of separation between the vertex of the cone K and points in the intersection of cone K and bound/hull H. The search of cone K against a bound/hull H is conditioned on the bound/hull H achieving a cone-hull measurement value with respect to cone K which satisfies an inequality condition with respect to measurement value assigned to cone K. The sense of the inequality, i.e. less than or greater than, depends on the whether the function Dist uses an increasing or decreasing function of separation.

While the search of the hull and cone hierarchies described above assumes a recursive form, it is noted that any search strategy may be employed. In one alternate embodiment, the hull and/or cone hierarchies are searched iteratively. Such a brute force solution may be advantageous when a large array of processors is available to implement the iterative search. In another embodiment, a level-order search is performed on the hull and/or cone hierarchies.

Size Conditioned Tree Search

As described above in connection with step 330, the ƒindVisible function determines a normalized size Size_C for cone C and a normalized size Size_H for hull H. In one embodiment, Size_H may be computed by dividing a solid diameter (or the square of a solid diameter) of hull H by the distance $d_{H,C}$ of hull H with respect cone C. Size_C may be determined by computing the solid angle subtended by cone C. Size_C may also be determined by computing the cone's cross sectional area at some convenient distance (e.g. distance one) from the viewpoint. The cross section may be normal to an axis of the cone C. The cone size Size_C for each cone in the cone hierarchy may be computed when the cone hierarchy is generated (e.g. at system initialization time).

Figure 10D:
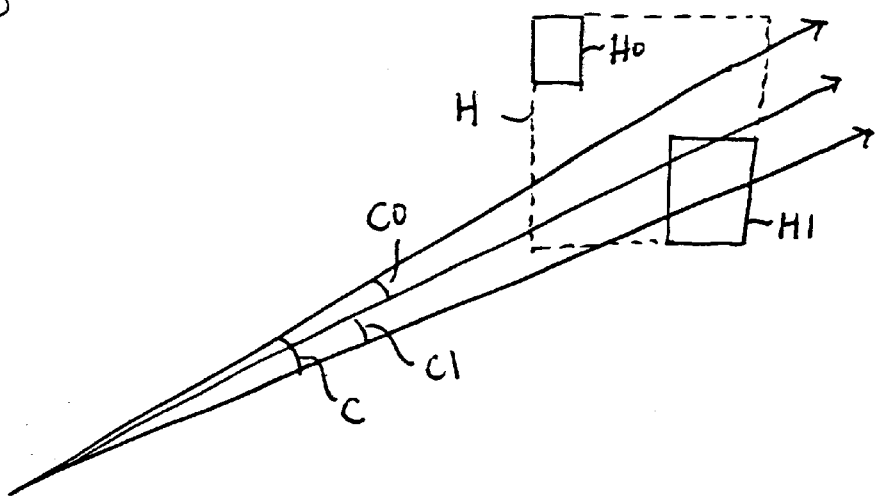
FIG. 10D illustrates a cone C which has a small normalized size compared to a bound hull H.

If the hull size Size_H is larger than the cone size Size_C as suggested by FIG. 10D, on average, the probability of at least one subhull of hull H having an empty intersection with cone C is larger than the probability of at least one subcone of cone C having an empty intersection with hull H. Thus, in this case, it may be more advantageous to explore the subhulls H0 and H1 of hull H with respect to cone C, rather than exploring the subcones of cone C with respect to hull H. For example, FIG. 10D illustrates an empty intersection between subhull H0 and cone C. This implies that none of the descendents of subhull H0 need to be searched against any of the descendents of cone C.

Figure 10E:
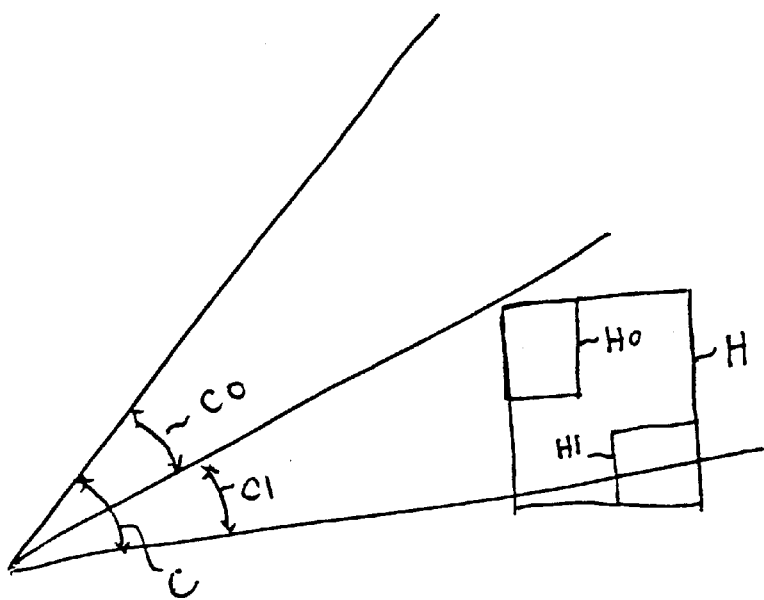
FIG. 10E illustrates a hull H which has a small normalized size compared to a cone C.

If the hull size Size_H is smaller than the cone size Size_C as suggested by FIG. 10E, on average, the probability of at least one subhull of hull H having an empty intersection with cone C is smaller than the probability of at least one subcone of cone C having an empty intersection with hull H. Thus, in this case, it may be more advantageous to explore the subcones C0 and C1 of cone C with respect to hull H, rather than exploring the subhulls of hull H with respect to cone C. For example, FIG. 10E illustrates an empty intersection between subcone C0 and hull H. This implies that none of the descendents of subcone C0 need to be searched against any of the descendents of hull H.

By selecting the larger entity (hull or cone) for refinement, the ƒindVisible function may more effectively prune the combined hull-cone tree, and determine the set of visible objects with increased efficiency.

Searching Subhulls in Order of Proximity to a Hull

Figure 10F:
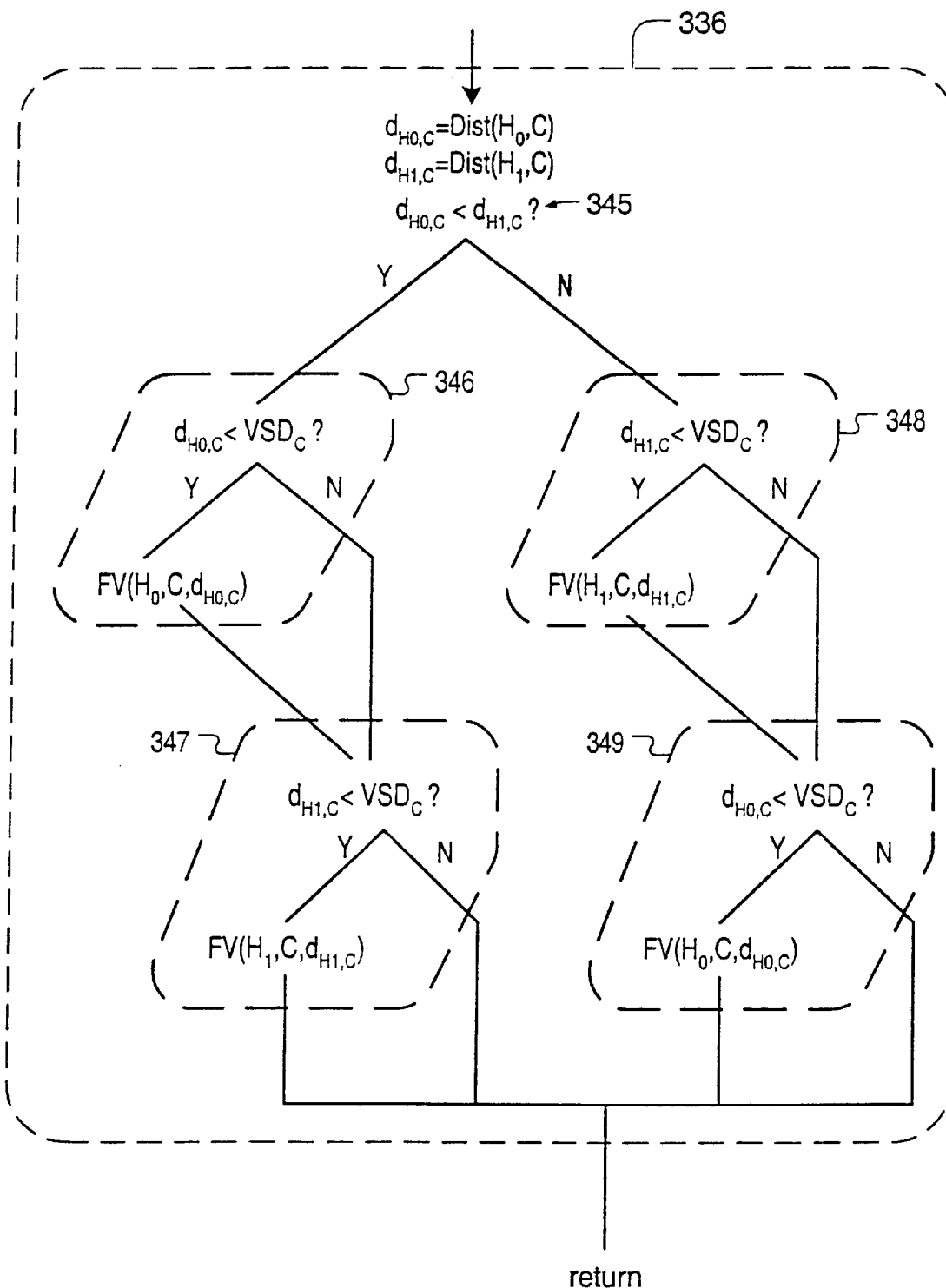
FIG. 10F illustrates one embodiment of step 336 of the visibility search algorithm.

In step 336, the subhulls H0 and H1 of the hull H are explored with respect to the cone C. In the embodiment of step 336 shown in FIG. 10C, step 336 comprises step 337 and step 338, and step 337 is performed before step 338. Thus, subhull H0 is explored with respect to cone C before subhull H1. In another embodiment of step 336, the subhulls H0 and H1 may be explored in order of their proximity to cone C as shown in FIG. 10F. The subhull which achieves a smaller cone-hull distance to the cone C is searched first.

If subhull H0 has a smaller cone-hull distance with respect to the cone C than subhull H1, subhull H0 is searched first as shown in steps 346 and 347. It is noted that the call to the function ƒindVisible in step 346 may cause the visibility distance value for cone C to decrease. Thus, the visibility distance value $VSC_C$ for cone C may actually have a smaller value when tested in step 347 than when tested in step 346. This underscores the importance of the test performed in step 345 to determine the subhull which is closer to cone C. The closer hull is searched first and allowed to preempt the more distant subhull. In other words, after searching the closer subhull, the more distant subhull may not need to be searched. Thus, the distance conditioned search order for subhulls advantageously improves the efficiency of the visibility search algorithm.

In steps 348 and 349, the subhulls are searched in the opposite order in response to the determination of step 345 that subhull H0 achieves a cone-hull distance from cone C which is greater than or equal to the corresponding distance for subhull H1. Again, the closer subhull H1 is searched first and allowed to preempt the search of the farther subhull H0.

The fixed-order subhull search shown in steps 306 and 308 of FIG. 10A may also be replaced by a distance conditioned search with similar attendant advantages.

Method for Displaying Visible Objects

Figure 11:
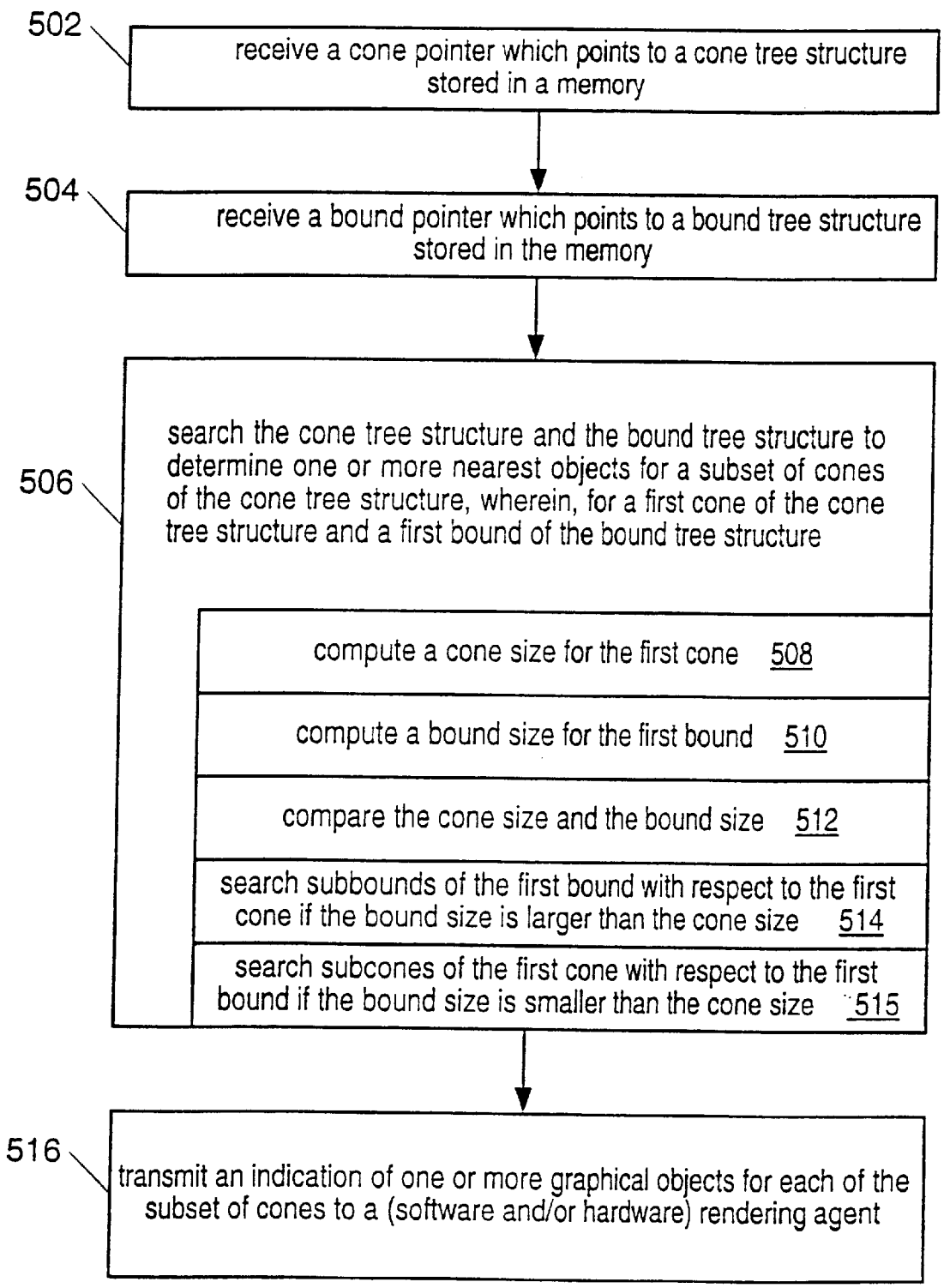
FIG. 11 illustrates one embodiment of a visibility search method for identifying and displaying visible objects in a graphics environment.

One embodiment of a method for displaying visible objects in a graphics environment is described in the flowchart of FIG. 11. A visibility search algorithm executing on one or more processors (e.g. CPU 102 and/or one or more processors situated within graphics accelerator 112) controls the determination of a set of visible objects for rendering and display on a display device (e.g. display screen 84).

In step 502, the visibility search algorithm may receive a cone pointer which points to a cone tree structure stored in memory (e.g. memory 106), i.e. the cone pointer may point to the root cone of the cone tree structure. In step 504, the visibility search algorithm may receive a pointer to a bound tree structure (e.g. a hull tree) stored in memory. The bound tree structure comprises a hierarchical tree of bounds. The leaf bounds of the bound tree structure contain graphical objects.

In step 506, the visibility search algorithm may search the cone tree structure and the bound tree structure to determine one or more nearest objects for a subset of cones from the cone tree structure. For example, in one embodiment, the subset of cones comprises the leaf cones of the cone tree structure. The dual tree search of step 506 may start with the root cone of the cone tree structure and the root bound (e.g. hull) of the bound tree structure. Processing bandwidth may be saved by requesting rendering computations only for the objects which are visible (i.e. the one or more nearest objects in each leaf cone). The nearest object within a leaf cone is a visible object for that leaf cone. The second nearest object in a leaf cone may have a high probability of being visible depending on the size of the leaf cone. The number K of nearest objects which are identified for leaf cones may be a function of leaf cone size.

In step 516, the visibility search algorithm may transmit an indication of the one or more nearest objects for the subset of cones to a rendering agent such as a software renderer or a hardware rendering unit. A hardware rendering unit may be comprised within graphics accelerator 112. The hardware rendering unit may perform screen space rasterization on the indicated objects. The resulting pixel data may be processed in a z-buffer, and pixels which survive the z-buffer comparison may be transmitted to a display device.

In one embodiment, graphics accelerator 112 may be configured to receive the indicated set of visible objects, and to render the visible objects in terms of samples in a virtual screen space. The samples may be stored in a sample buffer which automatically performs z-buffering. Filtering hardware comprised within the graphics accelerator 112 may operate on (e.g. may convolve) the buffered samples to generated pixel values. The output pixel values may be transmitted to a display device such as display screen 84.

In a second embodiment, CPU 102 may transmit the visible object indications (e.g. pointers) to a remote hardware rendering unit through a network (e.g. the Internet). In a third embodiment, computer system 80 may not include a graphics accelerator. Thus, the visibility search algorithm may transmit visible object indications (e.g. pointers) to a software renderer running on CPU 102 or some other processor operatively coupled to CPU 102.

In a third embodiment, CPU 102 may transmit the visible object indications (e.g. pointers) to an object transmission interface also running on CPU 102. The object transmission interface may manage the transmission of triangles corresponding to the indicated visible objects to the hardware rendering unit.

Step 506 comprises operating on cone-bound pairs. In terms of a first cone of the cone tree structure and a first bound of the bound tree structure, step 506 comprises steps 508 through 515 as follows. The first cone and first bound are assumed to be non-terminal nodes of their respective tree structures. Thus, the first cone contains subcones, and the first bound contains subbounds (i.e. children bounds).

In step 508, the visibility search algorithm may compute (or access from memory) a normalized cone size for the first cone. The cone tree structure may comprises a hierarchical tree of cone nodes. Each cone node may store cone normal vectors and a normalized cone size for a corresponding cone. In some embodiments, the cone sizes are computed and stored when the cone tree structure is generated, prior to execution of the visibility search algorithm. In other embodiments, the cone sizes may be computed as needed during the visibility search algorithm.

In one embodiment, the normalized cone size may comprise an estimated area of projection of the first cone on the surface of a sphere of fixed radius (e.g. radius one) centered at the vertex of the first cone. In a second embodiment, the normalized cone size may be a cross sectional area of the first cone. For example, the visibility search algorithm may compute the area of the cone's cross section generated by a plane normal to the cone's axis at some fixed distance (e.g. distance one) from the cone's vertex. In a third embodiment, the normalized cone size of the first cone may be some function of its refinement level number. For example, cones at the first, second, and third refinement levels may of the cone tree may have sizes proportional to ½, ¼ and ⅛ respectively. At the $R^{th}$ refinement level, a cone may have a normalized size proportional to $1/(2^R)$, where ^ denotes exponentiation. In this scheme, the root cone is defined to be at level zero. A variety of methods for computing the normalized cone size are contemplated.

In step 510, the visibility search algorithm may compute a normalized bound size (e.g. hull size) for the first bound. In one embodiment, the normalized bound size may comprise an estimated area of projection of the first bound on the surface of a sphere of fixed radius (e.g. radius one) centered at the vertex of the first cone (i.e. the viewpoint). In a second embodiment, the normalized bound size may comprise an area of profile of the first bound with respect to the cone's vertex divided by the cone-bound distance between the first cone and the first bound. In a third embodiment, the normalized bound size may comprise some function of one or more solid diameters of the first bound. The solid diameter (s) may be computed when the first bound is constructed, and stored along with the first bound. Alternatively, the solid diameter(s) may be computed when the first bound is accessed (or first accessed) in the visibility search algorithm. A variety of methods for computing the normalized bound size are contemplated.

In step 512, the visibility search algorithm may compare the cone size to the bound size, or more generally, may perform a relative size test on some function of the cone size and some function of the bound size.

In step 514, the visibility search algorithm may search subbounds of the first bound with respect to the first cone if the bound size is larger than the cone size.

In step 515, the visibility search algorithm may search subcones of the first cone with respect to the first bound if the bound size is smaller than the cone size.

In one embodiment of step 514, the visibility search algorithm may search a first subbound of the first bound with respect to the first cone by:

(a) computing a first cone-bound separation value (e.g. a distance value as described above in conjunction with FIGS. 10A–C) for the first subbound with respect to the first cone;

(b) determining whether the first cone-bound separation value satisfies an inequality condition with respect to a measurement value (e.g. the visibility distance value described above) associated with the first cone; and (c) searching the first subbound with respect to said first cone if the inequality condition is satisfied.

In one embodiment of step 515, the visibility search algorithm may search a first subcone of the first cone with respect to the first bound by:

(c) computing a first cone-bound separation value (e.g. a distance value as described above in connection with FIGS. 10A–C) for the first subcone with respect to the first bound;

(d) determining whether the first cone-bound separation value satisfies an inequality condition with respect to a measurement value associated with the first subcone; and (e) searching the first subcone with respect to the first bound if the inequality condition is satisfied.

The visibility search algorithm may update the measurement value associated with the first cone with the extremum (e.g. maximum or minimum) of the measurement values associated with the subcones after searching the subcones with respect to the first bound. The choice of the maximum as the extremum is associated with embodiments which compute cone-bound separation based on an increasing function of separation. The choice of minimum as the extremum is associated with embodiments which compute cone-bound separation based on a decreasing function of separation.

As described above in connection with FIGS. 6–9, a cone hierarchy (i.e. cone tree structure) may be constructed by refining an initial cone. In one embodiment, the initial cone is the entire space. In a second embodiment, the initial cone contains the view frustum and a neighborhood around the view frustum. Thus, if the viewing orientation (i.e. viewing direction) changes so that the new view frustum remains within the initial cone, the cone hierarchy may not need to be reconstructed, thereby saving computational bandwidth. Each cone in the cone hierarchy may be initially assigned a measurement value which corresponds to totally un-occluded visibility.

In some embodiments, the cone-bound separation value for a given cone and bound may be determined by minimizing an increasing function of separation distance between the vertex of the cone and points in the intersection of the cone and the bound. In this case, the inequality condition referred to above is said to be satisfied when the cone-bound separation value is less than the measurement value associated with the cone.

The increasing function of separation distance may be specified by a vector norm. For example, the expression $\|s\|$ defines an increasing function of separation distance, where s is a displacement vector representing the vector difference between the vertex of the first cone and an arbitrary point in the intersection of the first cone and the first bound, and $\|\cdot\|$ denotes a vector norm. Examples, of vector norms include the $L^1$ norm, the $L^2$ norm, the $L^\infty$ norm, and in general, any of the $L^p$ norms where p is any real number in the range from one to infinity inclusive. The $L^1$ norm of a vector is defined as the sum of the absolute values of its components. The $L^2$ norm of a vector is defined as the square root of the sum of the squares of the vector components. The $L^\infty$ norm of a vector is defined as the maximum of the absolute values of the vector components.

In one embodiment, the cone-bound separation value for a given cone and bound may be computed by solving a linear programming problem using the linear constraints given by normal matrix S for the cone, and the linear constraints given by the normal matrix N and the extent vector c for the bound. Recall the discussion in connection with FIGS. 9A–9C.

In an alternate embodiment, the cone-bound separation value comprises a merit of proximity (i.e. closeness) between the cone and the bound which is determined by maximizing a decreasing function of separation distance between the vertex of the cone and points in the intersection of the cone and the bound. In this case, the inequality condition referred to above is said to be satisfied when the cone-bound separation value is greater than the measurement value associated with the cone.

A Terminal Cone-bound Pair

Figure 12:
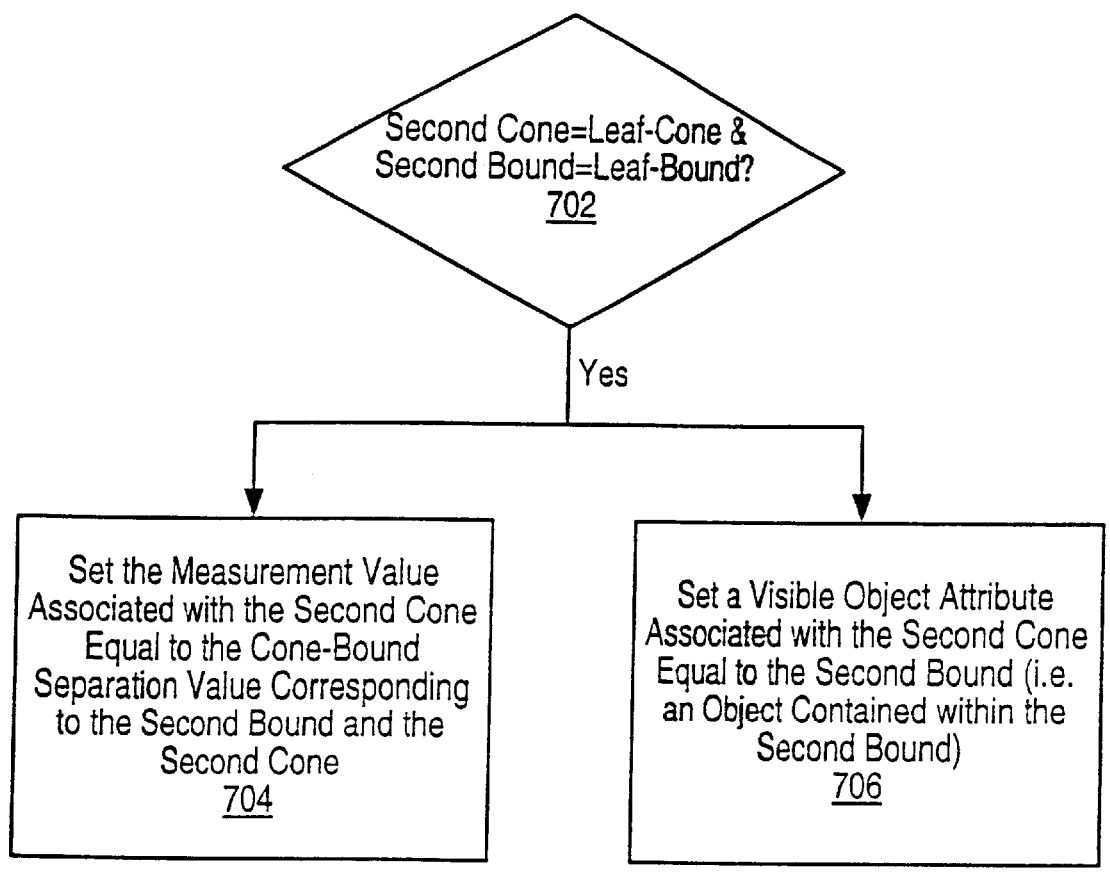
FIG. 12 illustrates processing steps which may be performed when the visibility search method arrives at a terminal cone and a terminal bound.

As the dual tree search step 506 progresses, it will eventually reach a cone-bound pair where the cone and bound comprising the pair are both leaves of their respective tree structures. FIG. 12 illustrates a portion of step 506 operating on a second bound and a second cone which are leaves of their respective tree structures. In step 702, the visibility search algorithm determines whether the second cone and the second bound are leaves of their respective tree structures. If they are both leaves, the visibility search algorithm (a) sets the measurement value associated with the second cone equal to a cone-bound separation value (e.g. the visibility distance value) corresponding to the second bound and the second cone as indicated in step 704, and (b) sets a visible object attribute associated with the second cone equal to the second bound (i.e. a pointer to an object contained within the second bound) as shown in step 706. It is noted that steps 704 and 706 may be performed in any order or in parallel.

A Terminal Cone with a Non-terminal Bound

Figure 13:
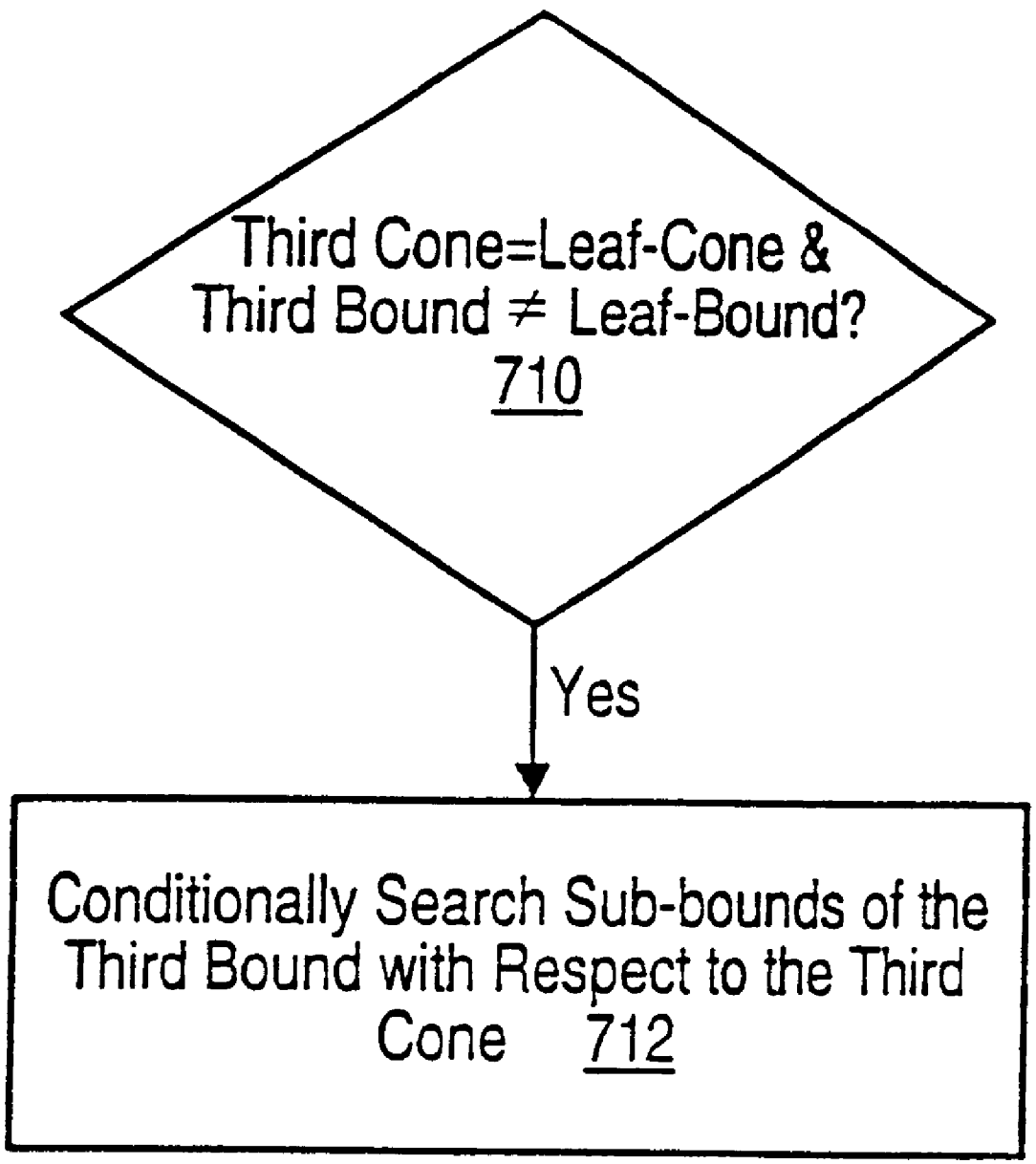
FIG. 13 illustrates processing steps which may be performed when the visibility search method arrives at a terminal cone and a non-terminal bound.

As the dual tree search step 506 progresses, it may eventually reach a cone-bound pair where the cone is a leaf of the cone tree structure and the bound is not a leaf of the bound tree structure. FIG. 13 illustrates a portion of step 506 operating on a third cone which is a leaf cone of the cone tree structure and a third bound which is a non-leaf of the bound tree structure. In step 710, the visibility search algorithm determines whether the third cone is a leaf-cone of the cone tree structure, and the third bound is a non-leaf bound of the bound tree structure, i.e. a non-terminal bound. If the third cone is a leaf cone and the third bound is not a leaf bound, the sub-bounds of the third bound are conditionally searched with respect to the third cone as indicated in step 712. This conditional search is similar to the conditional search of the subbounds of the first bound with respect to the first cone described above.

A Terminal Hull with a Non-terminal Cone

Figure 14:
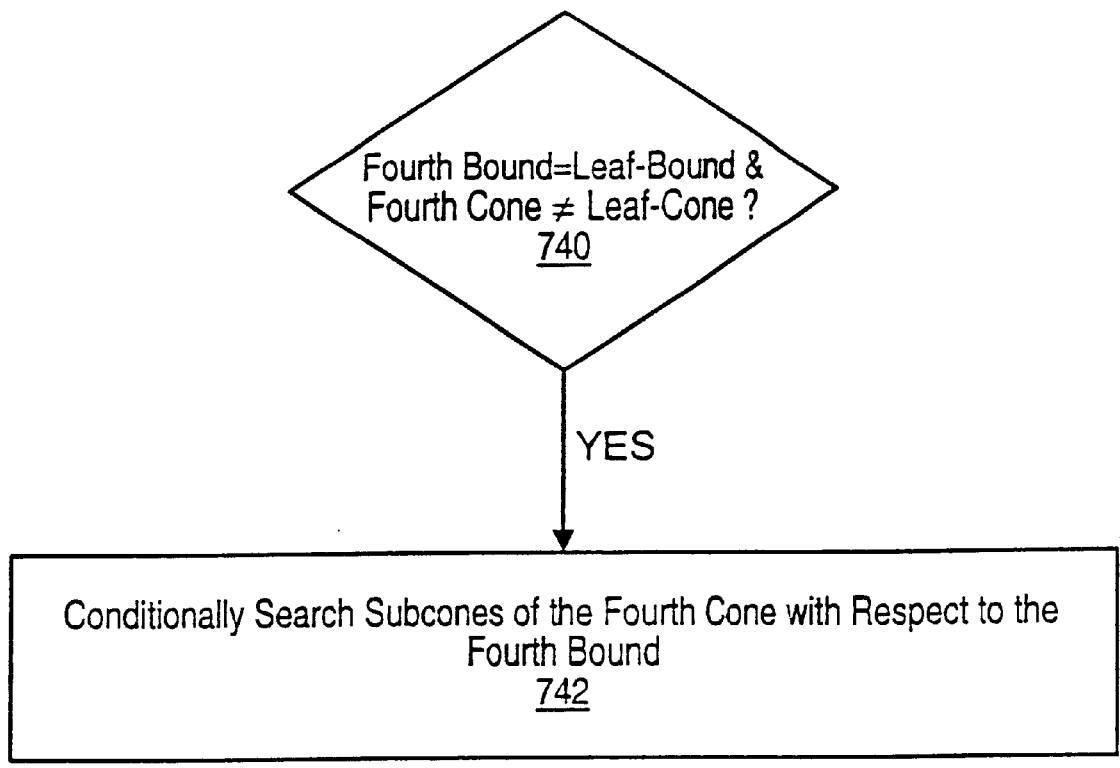
FIG. 14 illustrates processing steps which may be performed when the visibility search arrives at a terminal bound and a non-terminal cone.

As the dual tree search step 506 progresses, it may eventually reach a cone-bound pair where the cone is a non-leaf of the cone tree structure and the bound is a leaf of the bound tree structure. FIG. 14 illustrates a portion of step 506 operating on a fourth cone which is a non-leaf of the cone tree structure and a fourth bound which is a leaf of the bound tree structure. In step 740, the visibility search algorithm determines if the fourth bound is a leaf of the bound tree structure and the fourth cone is a non-leaf of the cone tree structure. If the fourth bound is a leaf of the bound tree structure and the fourth cone is a non-leaf of the cone tree structure, the visibility search algorithm conditionally searches the subcones of the fourth cone with respect to the fourth bound. This conditional search is similar to the conditional search of the subcones of the first cone with respect to the first bound described above.

In some embodiments, the leaf-cones subtend angular sectors larger than one pixel. Thus, after termination of the visibility search algorithm described above, the leaf-cones may be further processed by a ray-based exploration method to determine the values for individual pixels within leaf-cones.

Although the search of the bound tree structure and the cone tree structure described above assumes a recursive form, alternate embodiments are contemplated where a level-order search or iterative search is performed on one or both of the bounding tree structure and cone tree structure.

Additional Embodiments

A wide variety of system and method embodiments are contemplated in addition to those discussed above. In one embodiment, a method for displaying visible objects on a display device may comprise the following operations:

(1) comparing a bound size for a first bound in a bound tree structure to a cone size corresponding to a first cone in a cone tree structure;

(2) searching subbounds of the first bound with respect to the first cone if the bound size is larger than the cone size, wherein the operation of searching subbounds of the first bound with respect to the first cone is used to identify one or more graphical objects which are visible with respect to the first cone; and (3) transmitting an indication of the one or more graphical objects for rendering.

The method may further comprise searching subcones of the first cone with respect to the first bound if the cone size is larger than the bound size, wherein the operation of searching subcones of the first cone with respect to the first bound is also used to identify the one or more graphics objects which are visible with respect to the first cone. The method may also include computing the cone size and/or the bound size. Alternatively, an external system/device may compute the cone size and/or bound size, and provide the cone size and/or bound size as inputs for the comparison operation (1). The method may be implemented on one or more processors which execute program code stored in a memory subsystem.

Method for Constructing a Bounding Hierarchy

Figure 15:
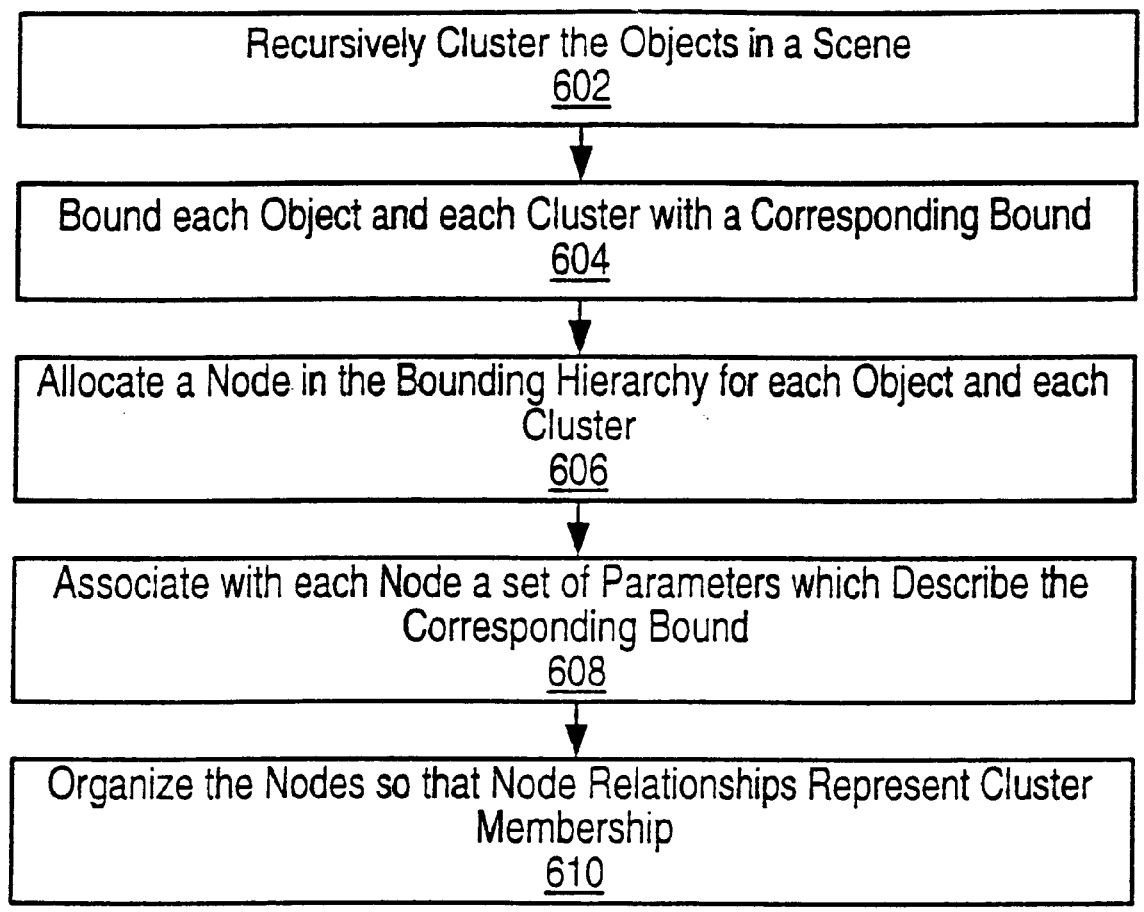
FIG. 15 illustrates one embodiment of the process of recursively clustering a collection of objects to form a bounding hierarchy.

FIG. 15 illustrates the construction of a bounding hierarchy (i.e. a bounding tree structure) from a collection of objects. The collection of objects may be accessed from memory 106. In step 602, the objects in the graphics scene may be recursively clustered. Objects may be assembled into clusters preferably based on proximity. These first order clusters are themselves assembled into second order clusters. Clusters of successively higher order are formed until all the objects are contained in one universal cluster. Objects may be considered as order zero clusters. In step 604, each cluster of all orders is bounded with a corresponding bound. The bounds are preferably polytope hulls as described above in connection with FIGS. 4 and 5. However, other types of bounds are contemplated such as, e.g., quadratic surfaces, generalized polynomial bounds, etc.

In step 606, a hierarchical tree of bounds is generated by allocating a node for each of the objects and clusters. In step 608, each node is assigned parameters which describe (characterize) the corresponding bound. In one embodiment this parameter assignment comprises storing the extent vector c which locates the polytope hull faces as described in connection with FIGS. 5A and 5B. In step 610, the nodes are organized so that node relationships correspond to cluster membership. For example, if node A is the parent of node B in the bounding hierarchy, then the cluster corresponding to node A contains a subcluster corresponding to node B, and the bound for node A contains the bound for node B.

Although the construction of the cone hierarchy above has been described in terms of recursive clustering, it is noted alternative embodiments are contemplated which use other forms of clustering such as iterative clustering.

Computing the Cone Restricted Distance Function

Recall that evaluation of the cone-hull distance $f_C(H)$ of a hull H from a cone C calls for minimizing $\|x\|$ subject to the hull constraints $Ax \leq b$ and the cone constraints $Sx \leq 0$. The rows of matrix A comprise normals for the hull surfaces. The rows of matrix S comprise normals for the cone surfaces. This minimization may be formulated as a nonlinear programming problem. For example, the nonlinear programming problem reduces to a quadratic programming problem when a Euclidean norm is used, and a linear programming problem when the $L^1$ norm is used. The cone-hull distance computation is herein referred to as a geometric query.

It is also noted that cone-hull separation may be measured by maximizing an decreasing function separation such as $\|x\|^{-1}$ for points x satisfying the bound/hull constraints and the cone constraints. Thus, in general a cone-hull separation value may be computed by determining an external (i.e. minimal or maximal) value of the separation function subject to the cone constraints and the bound/hull constraints.

The use of a hierarchy of cones instead of a collection of rays is motivated by the desire for computational efficiency. Thanks to early candidate pruning that results from the double recursion illustrated earlier, fewer geometric queries are performed. These queries however are more expensive than the queries used in the ray casting method. Therefore, the cone query calculation may be designed meticulously. A sloppy algorithm could end up wasting most of the computational advantage provided by improvements in the dual tree search. For the linear programming case, a method for achieving a computationally tight query will now be outlined.

A piecewise-linear formulation of distance $f_c$ leads to the following linear program:

$$\min(v^T x) \text{subject to } Ax \leq b, Sx \leq 0.$$

The vector v is some member of the cone that is polar to the cone C. For instance, $v = -S^T e$, where e is the vector of all ones. [It is noted that the matrix S of cone normals S are outward normals to the cone surfaces. Thus, the negation of the sum of the normal vectors gives a polar vector.] The condition $Ax \leq b$ implies that the point x is within the bounding hull. The condition $Sx \leq 0$ implies that the point x is within the cone C. For an efficient solution method, the linear program problem is restated in term of its dual:

$$\max(b^T y) \text{subject to } A^T y + S^T z = v, 0 \leq y, 0 \leq z.$$

The dual objective value, $b^T y$ is infinite when the cone and bounding hull do not intersect (the variables y and z are the Lagrange multipliers of the previous problem's constraints).

In the preferred embodiment, the bounding hulls have sides normal to a fixed set of normal vectors. Thus, the matrix $A^T$ is the same for all hulls. For a given cone, the matrix $S^T$ and the vector v are also fixed. From this observation, it is apparent that the multi-dimensional polyhedron $$\{(y,z) : A^T y + S^T z = v, 0 \leq y, 0 \leq z\}$$

is associated with the cone. (In one embodiment, this polyhedron has seventeen dimensions. Fourteen of those dimensions come from the type of the fixed-direction bounding hull and an three additional dimensions come from the cone.) Since the polyhedron depends only on the cone matrix S, it is feasible to completely precompute the external structure of the polygon for each cone in the cone hierarchy. By complementary slackness, the vertices of the polyhedron will have at most three elements. The edges and external rays will have at most four non-zero elements. An abbreviated, simplex-based, hill-climbing technique can be used to quickly solve the query in this setting.

In one embodiment, the entire space is tessellated with cones, and visible objects are detected within the entire space. After this entire-space visibility computation, the set of visible objects may be culled to conform to the current view frustum, and the visible objects which survive the frustum culling may be rendered and displayed.

In an alternative embodiment, a less aggressive approach may be pursued. In particular, by determining beforehand a collection of the cones in the cone hierarchy which correspond to the view frustum in its current orientation, only this collection may be included in the visible-object-set computation.

Memory Media

As described above, the visibility software and visibility search program may be stored in memory 106 for access by processor 102 (and/or other processors internal or external to computer system 80). In addition, the visibility software and visibility search program may be stored in any desired memory media such as an installation media (e.g. CD-ROM, floppy disk, etc.), a non-volatile memory (e.g. hard disk, optical storage, magnetic tape, bubble memory, ROM, etc.), various kinds of volatile memory such as RAM, or any combination thereof. In some embodiments, the visibility software and visibility search program may be deposited on memory media for distribution to end users and/or customers. Also, the visibility software and visibility search program may be transmitted through a transmission medium (e.g. the atmosphere and/or free space, a network of computers, an electrical conductor, optical fiber, etc.) between an information source and destination.

In one embodiment, the visibility search program is implemented as part of an operating system. In a second embodiment, the visibility search program is implemented as a dynamic link library (DLL). In a third embodiment, the visibility search program is implemented as part of a device driver (e.g. a device driver for graphics accelerator 112).

In a fourth embodiment, the visibility search program is implemented as part of a JAVA 3D™ virtual machine or JAVA 3D API (application programming interface) which executes on processor 102. A user may access a remote server through a network. The server responsively generates a stream of graphics data comprising graphical objects. The visibility search program executing as part of the JAVA 3D virtual machine may determine a set of visible objects from the received graphical objects. The virtual machine may provide the set of visible objects (or pointers to the visible objects) to a rendering agent. The rendering agent may be a hardware rendering unit such as graphics accelerator 112. Alternatively, the rendering agent may be a software renderer which also runs on processor 102.

Multiple Objects Per Cone

In one embodiment of the visibility search algorithm, one or more nearest objects may be identified for each leaf cone (i.e. terminal cone). If each of the leaf cones have the resolution of a pixel, then the strategy of identifying the single nearest object in each leaf cone may be sufficient to guarantee detection of all visible objects. However, the visibility search of a cone hierarchy which is refined to pixel resolution is computationally expensive. The computational expense may be decreased by having fewer levels of refinement in the cone hierarchy. But fewer levels of refinement implies that the size of the leaf cones is larger. As the size of the leaf cones increases, there is an increasing probability that two or more objects will be visible to a single leaf cone, i.e. that the nearest object is not the only object visible to the cone. Therefore, the single-nearest-object strategy has an increased probability of reporting less than the full set of visible objects as the size of the leaf-cones increases, or equivalently, when fewer levels of cone refinement are used in the cone hierarchy.

In order to increase the probability of capturing the full set of visible objects, the visibility search algorithm may identify the first K nearest objects for each leaf cone, where K is an integer greater than or equal to two. Advantageously, the integer K may be a function of cone size. Thus, if the leaf cones have a resolution close to pixel resolution, integer K may be close to one. Conversely, if the leaf cone resolution is larger than pixel resolution, integer K may be larger.

A leaf cone node in the cone tree may store up to K object pointers, and K distance values $D_1, D_2, \ldots, D_K$ for the K nearest objects known to the leaf cone, where the distance value $D_J$ corresponds to the $J^{th}$ nearest object for $J=1, 2, \ldots, K$. Thus, $$D_1 \leq D_2 \leq \ldots \leq D_K.$$

These K distance values may be initialized to positive infinity. The largest distance value $D_K$, corresponding the $K^{th}$ object, may be maintained as the visibility distance $VSD_C$ value for the leaf-cone. Any object-hull H which achieves a cone-hull distance $d_{H,C}$ to the leaf cone which is smaller than the visibility distance value $VSD_C$ of the leaf cone will induce an update of the K closest objects and distances. The visibility search algorithm may determines where value $d_{H,C}$ fits in the system $D1 \leq D2 \leq \ldots \leq DK$. For example, if K=4 and $D_2 \leq d_{H,C} \leq D_3$, the visibility search algorithm may update the object pointers and distances as follows: $D_4 \leftarrow D_3$, $D_3 \leftarrow d_{H,C}$, $OBJ_4 \leftarrow OBJ_3$, $OBJ_3 \leftarrow H$. The object-hull becomes the new $3^{rd}$ closest objects. The first and second closest objects are unaffected in this example.

In some embodiments, computational efficiency may be maximized along the axis of high-cone-resolution/low-K-value on the one hand and low-cone-resolution/high-K-value on the other.

Adaptive Refinement of the Cone Hierarchy

In the foregoing discussion, the cone hierarchy is described as being constructed prior to initiation of the search for visible objects by the visibility search algorithm, and remains static during the search. Another alternative is to adaptively refine the cone hierarchy during the search procedure. In this fashion, the cone hierarchy may not waste storage for cones which will never interact with any objects. The cone hierarchy may be refined in response to user inputs. For example, cones which correspond to the user's current direction of gaze may warrant additional refinement. A given cone may remain unrefined until the search procedure discovers a bound which interacts with the given cone, at which time the cone may be refined. The refinement of a given cone may be further refined as additional interacting objects/bounds are discovered in order to more adequately distinguish the objects. In the context where objects are in motion, the movement of an object into a given cone's field of view may induce increased refinement of the given cone. If the user in a virtual environment stops to look at a given object, the cones defining that object may be increasingly refined.

Refinement of the cone hierarchy may be subject to the availability of computational cycles. According to the paradigm of successive warming, the initial cone tree may have only one or a few cones allowing a crude initial estimate of visible object set to be immediately displayed. As computational cycles become available the cone hierarchy may be successively refined and searched in order to provide an increasingly accurate display of the visible object set.

In general the cones of the cone hierarchy may be at differing levels of refinement. Cone refinement may be permitted only if the cone interacts with an object or bound (e.g. hull). Adaptive refinement of a cone may be terminated when the cone resolution equals that of a pixel or when no object occurs in the cone.

In one embodiment, a combination of fixed refinement and adaptive refinement of the cone hierarchy may be used.

In some embodiments, the visibility search algorithm may combine adaptive refinement of the cone hierarchy and identification of the K nearest objects/bound for each cone, where K changes as the refinement level changes.

Non-occluding Objects

Non-occluding objects are objects which do not totally occlude (i.e. block visibility) of other objects. For example, a transparent, semi-transparent, or translucent object may be a non-occluder. A screen door, tinted glass, a window with slats may be classified as non-occluders. Objects behind a non-occluder may be partially visible. In some embodiments, certain modifications of the visibility search algorithm may allow for the presence of non-occluding objects (NOOs) in the collection of objects to be searched. In particular, the visibility search algorithm may be configured to search for the first K nearest occluding objects and any NOO closer than the $K^{th}$ occluder in each leaf cone, where K may be a function of leaf cone size.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the headings used herein are for organizational purposes only and are not meant to limit the description provided herein or the claims attached hereto.

What is claimed is:

1. A method for displaying visible objects on a display device, the method comprising:

searching a cone tree structure and a bound tree structure to determine one or more nearest graphical objects for one or more cones of the cone tree structure, wherein, for a first cone of the cone tree structure and a first bound of the bound tree structure, said searching the cone tree structure and the bound tree structure includes:

computing a bound size for the first bound;

comparing the bound size to a cone size corresponding to the first cone;

searching subbounds of the first bound with respect to the first cone if the bound size is larger than the cone size;

transmitting an indication of the one or more nearest graphical objects for each of the one or more cones for rendering.

2. The method of claim 1, wherein said one or more cones comprise leaf cones of the cone tree structure.

3. The method of claim 1, wherein said searching subbounds of the first bound with respect to the first cone comprises:

computing a first cone-bound separation value for a first subbound of the first bound with respect to the first cone;

determining whether the first cone-bound separation value satisfies an inequality condition with respect to a measurement value associated with the first cone;

searching said first subbound with respect to said first cone in response to determining that the first cone-bound separation value satisfies the inequality condition with respect to the measurement value associated with the first cone.

4. The method of claim 1, wherein, for the first cone and the first bound, said searching the cone tree structure and the bound tree structure further comprises:

searching subcones of the first cone with respect to the first bound if the bound size is smaller than the cone size.

5. The method of claim 4, wherein said searching the subcones of the first cone with respect to the first bound includes:

computing a first cone-bound separation value for a first subcone of the first cone with respect to the first bound;

determining whether the first cone-bound separation value satisfies an inequality condition with respect to a measurement value associated with the first subcone;

searching the first subcone with respect to the first bound in response to the first cone-bound separation value satisfying the inequality condition with respect to the measurement value associated with the first subcone.

6. The method of claim 5 further comprising setting the measurement value associated with the first cone equal to an extremum of measurement values associated with said subcones after said searching said subcones with respect to the first bound.

7. The method of claim 1, further comprising initializing each cone of the cone tree structure with a measurement value which corresponds to un-occluded visibility.

8. The method of claim 1, wherein, for a second cone of the cone tree structure and a second bound of the bound tree structure, said searching the cone tree structure and the bound tree structure comprises:

(a) determining if said second cone is a leaf of the cone tree structure and said second bound is a leaf bound of the bound tree structure;

(b) setting a measurement value associated with the second cone equal to an extent of separation between the second bound and the second cone;

(c) setting a visible object attribute associated with the second cone equal to an object pointer value corresponding to the second bound;

wherein (b) and (c) are performed in response to said second cone being a leaf of the cone tree structure and said second bound being a leaf of the bound tree structure.

9. The method of claim 1, wherein, for the first cone and first bound, said searching the cone tree structure and the bound tree structure further comprises:

computing the cone size for the first cone based on cone parameters associated with the first cone stored in the cone tree structure.

10. The method of claim 1, wherein, for the first cone and first bound, said searching the cone tree structure and the bound tree structure further comprises:

reading the cone size corresponding to the first cone from a memory.

11. The method of claim 1 further comprising:

receiving a cone pointer which points to the cone tree structure stored in a memory; and receiving a bound pointer which points to a bound tree structure stored in the memory, wherein leaf bounds of the bound tree structure approximate a collection of graphical objects.

12. A computer system for displaying visible objects on a display device, the computer system comprising:

a memory configured to store a cone tree structure and a bound tree structure, wherein leaf bounds of the bound tree structure approximate a collection of graphical objects;

a processor configured to execute a visibility search algorithm stored in the memory;

wherein, in response to an execution of the visibility search algorithm, the processor is configured to search the cone tree structure and the bound tree structure to determine one or more nearest graphical objects for one or more cones of the cone tree structure, wherein, for a first cone of the cone tree structure and a first bound of the bound tree structure, said processor is configured to (a) compute a bound size for the first bound, (b) compare the bound size to a cone size corresponding to the first cone, (c) search subbounds of the first bound with respect to the first cone if the bound size is larger than the cone size, wherein the processor is further configured to transmit an indication of the one or more nearest graphical objects for each of the one or more cones for rendering.

13. The computer system of claim 12, wherein said one or more cones comprise leaf cones of the cone hierarchy.

14. The computer system of claim 12, wherein said processor is configured to search subbounds of the first bound with respect to the first cone by:

computing a first cone-bound separation value for a first subbound of the first bound with respect to the first cone;

determining whether the first cone-bound separation value satisfies an inequality condition with respect to a measurement value associated with the first cone;

searching the first subbound with respect to the first cone in response to determining that the first cone-bound separation value satisfies the inequality condition with respect to the measurement value associated with the first cone.

15. The computer system of claim 12, wherein said processor is further configured to search subcones of the first cone with respect to the first bound if the bound size is smaller than the cone size.

16. The computer system of claim 15, wherein said processor is configured to search the subcones of the first cone with respect to the first bound by:

computing a first cone-bound separation value for a first subcone of the first cone with respect to the first bound;

determining whether the first cone-bound separation value satisfies an inequality condition with respect to a measurement value associated with the first subcone; and searching said first subcone with respect to said first bound in response to the first cone-bound separation value satisfying the inequality condition with respect to the measurement value associated with the first subcone.

17. The computer system of claim 16, wherein the processor is further configured to set the measurement value associated with the first cone equal to an extremum of measurement values associated with said subcones after said searching said subcones with respect to the first bound.

18. The computer system of claim 12, wherein said processor is configured to search a second bound with respect to a second cone by:

(i) determining if said second cone is a leaf of the cone tree structure and said second bound is a leaf bound of the bound tree structure;

(ii) setting the measurement value associated with the second cone equal to a second measurement value of separation between the second bound and the second cone;

(iii) setting a visible object attribute associated with the second cone equal to an object pointer value corresponding to the second bound;

wherein said processor is configured to perform (ii) and (iii) in response to said second cone being a leaf of the cone tree structure and said second bound being a leaf of the bound tree structure.

19. The computer system of claim 12, wherein the processor is configured to compute the cone size for the first cone based on cone parameters associated with the first cone stored in the cone tree structure.

20. The computer system of claim 12, wherein the processor is configured to read the cone size from the memory.

21. A computer system for displaying visible objects on a display device, the computer system comprising:

a memory configured to store a cone hierarchy and a bounding hull hierarchy, wherein terminal bounds of the bounding hull hierarchy approximate a collection of graphical objects;

a processor configured to execute a visibility search algorithm stored in the memory;

wherein, in response to an execution of the visibility search algorithm, the processor is configured to search the cone hierarchy and the bounding hull hierarchy to determine one or more nearest graphical objects for one or more cones of the cone hierarchy, wherein said processor is configured to (a) compute a hull size for a first hull of the bounding hull hierarchy, (b) compare the hull size to a cone size corresponding to a first cone of the cone hierarchy, and (c) search subhulls of the first hull with respect to the first cone if the hull size is larger than the cone size, wherein the processor is further configured to transmit an indication of the one or more nearest graphical objects for the one or more cones for rendering and display.

22. The computer system of claim 21 further comprising a display device operatively coupled to the processor and configured to display the one or more nearest graphical objects for the one or more cones.

23. The computer system of claim 21 wherein said processor is further configured to (d) search subcones of the first cone with respect to the first hull if the hull size is smaller than the cone size.

24. A computer-readable medium comprising a plurality of computer program instructions, wherein the plurality of computer program instructions are executable by one or more processors to perform:

searching a cone tree structure and a bound tree structure to determine one or more visible objects for one or more cones of the cone tree structure, wherein, said searching the cone tree structure and the bound tree structure comprises searching a first cone of the cone tree structure with respect to a first bound of the bound tree structure, wherein said searching the first cone with respect to the first bound comprises:

estimating a normalized bound size for the first bound;

comparing the normalized bound size to a normalized cone size corresponding to the first cone;

searching subbounds of the first bound with respect to the first cone if the normalized bound size is larger than the normalized cone size;

transmitting an indication of the one or more visible objects for each of the one or more cones for rendering and display.

25. The computer-readable medium of claim 24, wherein said transmitting comprises transmitting the indication of the one or more visible object to a hardware rendering unit.

26. The computer-readable medium of claim 24, wherein said searching subbounds of the first bound with respect to the first cone comprises:
   computing a first cone-bound separation value for a first subbound of the first bound with respect to the first cone;
   determining whether the first cone-bound separation value satisfies an inequality condition with respect to a measurement value associated with the first cone;
   searching said first subbound with respect to said first cone in response to determining that the first cone-bound separation value satisfies the inequality condition with respect to the measurement value associated with the first cone.

27. The computer-readable medium of claim 24, wherein said searching the first cone with respect to the first bound further comprises:
   searching subcones of the first cone with respect to the first bound if the normalized bound size is smaller than the normalized cone size.

28. The computer-readable medium of claim 27, wherein said searching the subcones of the first cone with respect to the first bound includes:
   computing a first cone-bound separation value for a first subcone of the first cone with respect to the first bound;
   determining whether the first cone-bound separation value satisfies an inequality condition with respect to a measurement value associated with the first subcone;
   searching the first subcone with respect to the first bound in response to the first cone-bound separation value satisfying the inequality condition with respect to the measurement value associated with the first subcone.

29. The computer-readable medium of claim 28 wherein the computer program instructions are executable by the one or more processors to further perform:
   setting the measurement value associated with the first cone equal to an extremum of measurement values associated with said subcones after said searching said subcones with respect to the first bound.

30. The computer-readable medium of claim 24, wherein the computer program instructions comprise a visibility search program, wherein the visibility search program is configured to receive a collection of graphical objects from a graphical application program, and to construct the bound tree structure in response to receiving the collection of graphical objects.

31. The computer-readable medium of claim 24, wherein said searching the cone structure and the bound tree structure comprises searching a second cone of the cone tree structure with respect to a second bound of the bound tree structure, wherein said searching the second cone with respect to the second bound comprises:
   (a) determining if said second cone is a leaf of the cone tree structure and said second bound is a leaf bound of the bound tree structure;
   (b) setting a measurement value associated with the second cone equal to an extent of separation between the second bound and the second cone;
   (c) setting a visible object attribute associated with the second cone equal to an object pointer value corresponding to the second bound;
   wherein (b) and (c) are performed in response to said second cone being a leaf of the cone tree structure and said second bound being a leaf of the bound tree structure.

32. The computer-readable medium of claim 24, wherein said searching the first cone with respect to the first bound further comprises:
   computing the normalized cone size for the first cone based on cone parameters associated with the first cone stored in the cone tree structure.

33. The computer-readable medium of claim 24, wherein said searching the first cone with respect to the first bound further comprises:
   reading the normalized cone size corresponding to the first cone from a memory.

34. A computer-readable medium comprising a plurality of computer program instructions, wherein the plurality of computer program instructions are executable by one or more processors to perform:
   searching a cone hierarchy and a bounding hierarchy to determine one or more visible objects for one or more cones of the cone hierarchy, wherein, said searching the cone hierarchy and the bounding hierarchy comprises searching a first cone of the cone hierarchy with respect to a first bound of the bound hierarchy, wherein said searching the first cone with respect to the first bound comprises:
      estimating a bound size for the first bound;
      comparing the bound size to a cone size corresponding to the first cone;
      searching subbounds of the first bound with respect to the first cone if the bound size is larger than the cone size;
   transmitting an indication of the one or more visible objects for each of the one or more cones to a rendering agent for rendering and display.

35. The computer-readable medium of claim 34, wherein said rendering agent comprises a software renderer executing on at least one of the one or more processors.

36. The computer-readable medium of claim 34, wherein said rendering agent comprises a hardware rendering unit.

37. The computer-readable medium of claim 34, wherein said searching the first cone with respect to the first bound further comprises:
   searching subcones of the first cone with respect to the first bound if the bound size is smaller than the cone size.

38. The computer-readable medium of claim 34, wherein said searching the cone hierarchy and the bounding hierarchy comprises searching a second cone of the cone hierarchy with respect to a second bound of the bounding hierarchy, wherein said searching the second cone with respect to the second bound comprises:
   (a) determining if said second cone is a leaf of the cone hierarchy and said second bound is a leaf bound of the bounding hierarchy;
   (b) setting a measurement value associated with the second cone equal to an extent of separation between the second bound and the second cone;
   (c) setting a visible object attribute associated with the second cone equal to an object pointer value corresponding to the second bound;
   wherein (b) and (c) are performed in response to said second cone being a leaf of the cone hierarchy and said second bound being a leaf of the bounding hierarchy.

39. The computer-readable medium of claim 34, wherein said searching the first cone with respect to the first bound further comprises:
   computing the cone size for the first cone based on cone parameters associated with the first cone stored in the cone hierarchy.

40. The computer-readable medium of claim 34, wherein said searching the first cone with respect to the first bound further comprises:
   reading the cone size corresponding to the first cone from a memory.

41. The computer-readable medium of claim 34 wherein the plurality of computer program instructions are executable by the one or more processors to further perform:
   receiving a cone pointer which points to the cone hierarchy stored in a memory; and
   receiving a bound pointer which points to a bounding hierarchy stored in the memory, wherein leaf bounds of the bounding hierarchy approximate a collection of graphical objects.

42. A method for displaying visible objects on a display device, the method comprising:
   comparing a bound size for a first bound in a bound tree structure to a cone size corresponding to a first cone in a cone tree structure;
   searching subbounds of the first bound with respect to the first cone if the bound size is larger than the cone size, wherein said searching subbounds of the first bound with respect to the first cone is used to identify one or more graphical objects which are visible with respect to the first cone; and
   transmitting an indication of the one or more graphical objects for rendering.

43. The method of claim 42 further comprising:
   searching subcones of the first cone with respect to the first bound if the cone size is larger than the bound size, wherein said searching subcones of the first cone with respect to the first bound is also used to identify the one or more graphics objects which are visible with respect to the first cone.

44. The method of claim 42 further comprising computing the cone size of the first cone.

45. The method of claim 42 further comprising computing the bound size of the first bound.

46. A computer system for displaying visible objects on a display device, the computer system comprising:
   a memory configured to store a cone tree structure and a bound tree structure, wherein leaf bounds of the bound tree structure approximate a collection of graphical objects;
   a processor configured to execute a visibility search algorithm stored in the memory;
   wherein, in response to an execution of the visibility search algorithm, the processor is configured to compare a bound size of a first bound of a bound tree structure to a cone size of a first cone of a cone tree structure, and to search subbounds of the first bound with respect to the first cone if the bound size is larger than the cone size, wherein said searching subbounds of the first bound with respect to the first cone is used to identify one or more objects which are visible with respect to the first cone, wherein the processor is further configured to transmit an indication of the one or more graphical objects for rendering.

47. The computer system of claim 46, wherein said processor is further configured to search subcones of the first cone with respect to the first bound if the cone size is larger than the bound size, wherein said searching subcones of the first cone with respect to the first bound is also used identify the one or more objects which are visible with respect to the first cone.

48. The computer system of claim 46, wherein said processor is further configured to compute the cone size of the first cone.

49. The method of claim 46 further comprising computing the bound size of the first bound.

50. A method for displaying visible objects on a display device, the method comprising:
   (a) receiving a hierarchy of boundary information for a plurality of three-dimensional graphical objects;
   (b) receiving a hierarchy of cones; and
   (c) determining whether a particular cone and a particular bound intersect, and in response to determining that the particular cone and the particular bound intersect:
      determining a relative size value for the particular cone and the particular bound; and
      repeating (c) for a subcone of the particular cone if the relative size of the particular cone is larger than the relative size of the particular bound; or
      repeating (c) for a subbound of the particular bound if the relative size of the particular bound is larger than the relative size of the particular cone.

* * * * *